(12) United States Patent
Li et al.

(10) Patent No.: US 11,804,604 B2
(45) Date of Patent: Oct. 31, 2023

(54) POSITIVE ELECTRODE PIECE IN A BATTERY, ELECTROCHEMICAL DEVICE AND APPARATUS

(71) Applicant: Contemporary Amperex Technology Co., Limited, Fujian (CN)

(72) Inventors: Jing Li, Ningde (CN); Qingrui Xue, Ningde (CN); Wei Li, Ningde (CN); Zige Zhang, Ningde (CN); Yang Zhang, Ningde (CN); Xianwei Yang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/139,124

(22) Filed: Dec. 31, 2020

(65) Prior Publication Data
US 2021/0151769 A1 May 20, 2021

Related U.S. Application Data

(63) Continuation of application No. PCT/CN2019/129360, filed on Dec. 27, 2019.

(30) Foreign Application Priority Data

Jul. 1, 2019 (CN) .......................... 201910586647.X

(51) Int. Cl.
*H01M 4/66* (2006.01)
*H01M 4/133* (2010.01)
(Continued)

(52) U.S. Cl.
CPC .......... *H01M 4/667* (2013.01); *H01M 4/133* (2013.01); *H01M 4/134* (2013.01); *H01M 4/602* (2013.01);
(Continued)

(58) Field of Classification Search
None
See application file for complete search history.

(56) References Cited

U.S. PATENT DOCUMENTS

| 6,420,066 B1 * | 7/2002 | Frustaci | H01M 50/538 |
| | | | 429/94 |
| 2012/0237824 A1 * | 9/2012 | Koh | H01M 4/668 |
| | | | 429/211 |

(Continued)

FOREIGN PATENT DOCUMENTS

| CN | 101174685 A | 5/2008 |
| CN | 101884125 A | 11/2010 |

(Continued)

OTHER PUBLICATIONS

Matweb, Material Property Data Sheet for Aluminum, 2021.*

(Continued)

*Primary Examiner* — Jonathan G Leong
*Assistant Examiner* — Tony S Chuo
(74) *Attorney, Agent, or Firm* — Kilpatrick Townsend & Stockton LLP

(57) ABSTRACT

The present application relates to the field of battery, in particular to a positive electrode piece, an electrochemical device and an apparatus. The positive electrode piece of the present application includes a current collector and an electrode active material layer arranged on at least one surface of the current collector, where the current collector includes a support layer and a conductive layer arranged on at least one surface of the support layer. The thickness D2 of one side of the conductive layer D2 satisfies 30 nm≤D2≤3 μm, the material of the conductive layer is aluminum or aluminum alloy, and the density of the conductive layer is 2.5 g/cm³ to 2.8 g/cm³, and a primer layer containing a (Continued)

conductive material and a binder is also arranged between the current collector and the electrode active material layer.

14 Claims, 5 Drawing Sheets

(51) Int. Cl.
*H01M 4/134* (2010.01)
*H01M 4/60* (2006.01)
*H01M 4/62* (2006.01)
*H01M 10/0525* (2010.01)
*H01M 4/02* (2006.01)

(52) U.S. Cl.
CPC ........... *H01M 4/623* (2013.01); *H01M 4/661* (2013.01); *H01M 10/0525* (2013.01); *H01M 2004/028* (2013.01)

(56) References Cited

U.S. PATENT DOCUMENTS

| | | | | |
|---|---|---|---|---|
| 2014/0072873 | A1* | 3/2014 | Wang | H01M 4/621 429/217 |
| 2014/0370349 | A1 | 12/2014 | Kwon et al. | |
| 2017/0353585 | A1 | 12/2017 | Krishnan | |
| 2019/0173092 | A1* | 6/2019 | Liang | H01M 4/662 |
| 2020/0083542 | A1* | 3/2020 | Yushin | H01M 4/8828 |

FOREIGN PATENT DOCUMENTS

| | | | | |
|---|---|---|---|---|
| CN | 102847859 | A | | 1/2013 |
| CN | 106935901 | A | | 7/2017 |
| CN | 107240721 | A | | 10/2017 |
| CN | 107732146 | A | * | 2/2018 ........ H01M 10/0525 |
| CN | 107851836 | A | | 3/2018 |
| CN | 108682788 | A | | 10/2018 |
| CN | 109873160 | A | | 6/2019 |
| CN | 109873164 | A | | 6/2019 |
| CN | 109873166 | A | | 6/2019 |
| EP | 3796423 | A1 | | 3/2021 |
| EP | 3796436 | A1 | | 3/2021 |
| JP | H11-67277 | A | | 3/1999 |
| WO | WO 2012/127561 | A1 | * | 9/2012 .............. H01M 4/66 |
| WO | 2019109928 | A1 | | 6/2019 |

OTHER PUBLICATIONS

"Material Property Data Sheet for Aluminum", MatWeb, 2021.*
Matweb Datasheet for Aluminum, 2022.*
Machine translation of WO 2012/127561 A1.*
Search Report dated Apr. 1, 2020 in corresponding International Application No. PCT/CN2019/129360; 5 pages.
Written Opinion dated Apr. 1, 2020 in corresponding International Application No. PCT/CN2019/129360; 11 pages.
Extended European Search Report dated Sep. 30, 2021, in connection with corresponding European Application No. 19933228.9; 9 pages.
English translation of the International Search Report received in PCT Application PCT/CN2019/129360 dated Apr. 1, 2020.
English translation of the Written Opinion received in the corresponding International Application PCT/CN2019/129360 dated Apr. 1, 2020.
Notification to Grant Patent Right received in the corresponding Chinese Application 201910586647.X, dated Aug. 15, 2023.
First Office Action received in the corresponding Chinese Application 201910586647.X, dated Jun. 16, 2023.

* cited by examiner

POSITIVE ELECTRODE PIECE IN A BATTERY, ELECTROCHEMICAL DEVICE AND APPARATUS

CROSS-REFERENCE TO RELATED APPLICATIONS

This application is a continuation of International Application No. PCT/CN2019/129360, filed on Dec. 27, 2019, which claims priority to Chinese Patent Application No. 201910586647.X, which was filed with China National Intellectual Property Administration on Jul. 1, 2019. Both of the aforementioned applications are hereby incorporated by reference in their entireties.

TECHNICAL FIELD

The present application belongs to the technical field of electrochemistry and, in particular, to a positive electrode piece, an electrochemical device and an apparatus.

BACKGROUND

Lithium-ion batteries are widely used in electric vehicles and consumer electronic products because of their high energy density, high output power, long cycle life and low environmental pollution. However, lithium-ion batteries are prone to fire and explosion under abnormal conditions such as extrusion, collision or puncture, which may cause serious harm. Therefore, the safety problem of lithium-ion battery limits the application and popularization of lithium-ion battery to a great extent.

Although researchers have proposed many methods to improve the safety of the battery, there is still a lack of effective means for the hidden danger caused by the battery puncture. In view of this, it is necessary to provide a kind of battery which can improve battery safety, especially the nail piercing safety.

SUMMARY

A purpose of the present application is to provide a battery with improved safety, especially with improved nail piercing safety.

A further purpose of the present application is to provide a battery with good safety, higher energy density, improved electrochemical performance and other excellent performances.

An embodiment of the present application provides a positive electrode piece, including a current collector and an electrode active material layer disposed on at least one surface of the current collector, where the current collector includes a support layer and a conductive layer disposed on at least one surface of the support layer. The single side thickness D2 of the conductive layer satisfies: 30 nm≤D2≤3 µm. The material of the conductive layer is aluminum or aluminum alloy, and the density of the conductive layer is 2.5 g/cm$^3$ to 2.8 g/cm$^3$. And a primer layer including a conductive material and a binder is also arranged between the current collector and the electrode active material layer.

The present application also provides an electrochemical device, which includes a positive electrode piece, a negative electrode piece, an isolation membrane and electrolyte, where the positive electrode piece is the positive electrode piece mentioned above.

The present application also provides a device, which includes the electrochemical device.

The technical solution of the present application has at least the following beneficial effects:

Firstly, the positive electrode piece in the present application adopts a composite current collector, the composite current collector has a thin conductive layer and the support layer is made of polymer material or polymer composite material, so it can significantly improve the energy density of the electrochemical device, for example, weight energy density.

Secondly, in the composite current collector adopted in the present application, the conductive layer is aluminum or aluminum alloy metal layer with high density (density is 2.5 g/cm$^3$ to 2.8 g/cm$^3$), so that the composite current collector and the positive electrode piece have excellent electrical conductivity and flow capacity, so that the positive electrode piece and electrochemical device of the present application can have good electrochemical performance.

Thirdly, according to the theoretical analysis, because the composite current collector has a thin conductive layer, the metal burrs produced in abnormal cases such as nail piercing is smaller, and polymer material or polymer composite material is used as the support layer. Therefore, in abnormal cases such as nail piercing, the short-circuit resistance is larger than that of the conventional metal current collector, so the safety performance of the electrochemical device is greatly improved compared with the conventional metal current collector. However, when the density of the conductive layer is higher and/or the thickness D2 of the conductive layer is larger, the nail piercing safety performance cannot reach the ideal level. Given the high density of the conductive layer of current collector material used in the positive electrode piece of the present application, a primer layer containing conductive material and binder is also arranged between the composite current collector and the electrode active material layer. Thus, in abnormal cases such as nail piercing, the short-circuit resistance can be increased and the metal burrs that may be produced in the current collection can be effectively wrapped, so as to effectively improve the nail piercing safety performance of the electrochemical device.

Fourthly, because the rebound degree of the composite current collector is larger than that of the conventional metal current collector, the combination between the current collector and the active material layer is easy to be destroyed in the process of electrode piece processing, the setting of the primer layer can increase the combination degree between the current collector and the active material layer, so that the electrode piece containing the composite current collector has less polarization and better electrochemical performance.

Therefore, the positive electrode piece and electrochemical device of the present application have good energy density, excellent electrochemical performance and improved safety performance. The apparatus of the present application includes the electrochemical device in the present application, so it has at least the same advantages as the electrochemical device.

BRIEF DESCRIPTION OF DRAWINGS

The positive electrode piece, the electrochemical device, the apparatus and their beneficial effects of the present application are described in detail in combination with the attached drawings and specific embodiments.

DETAILED DESCRIPTION

Figure 1:
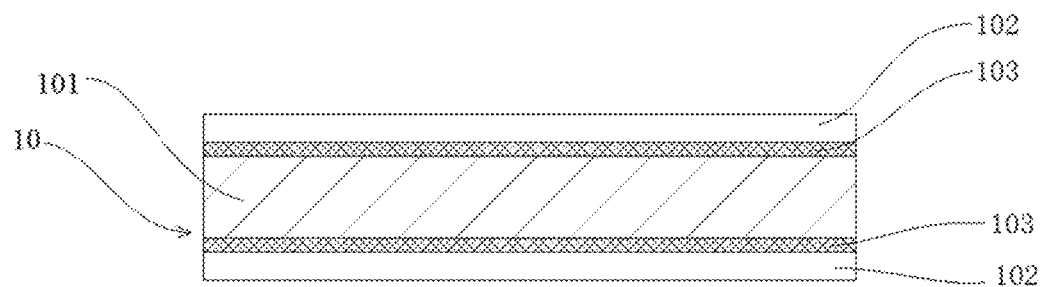
FIG. 1 is a schematic diagram of the cross-sectional structure of a positive current collector by a specific embodiment of the present application.

The present application will be further elaborate with reference to specific embodiments. It should be understood that these specific embodiments are only used to illustrate the present application and are not to limit the scope of the present application.

A large number of experimental results show that the internal short circuit of the battery is the root cause of the hidden danger of lithium-ion battery. The root cause of the short circuit in the battery lies in the electrical connection between the positive electrode and the negative electrode in the battery. In abnormal cases such as nail piercing, the direct contact between the metal burrs (usually Al metal burrs) in the positive electrode piece and the negative electrode piece will lead to a short circuit in the battery. The applicant for the present application has found that the metal burrs of the positive electrode piece can be effectively covered (or wrapped) by using a composite current collector combined with a coating design for the positive electrode piece, thereby preventing a short circuit in the battery and the resulting thermal runaway of the battery.

An embodiment of the present application provides a positive electrode piece, including a current collector and an electrode active material layer arranged on at least one surface of the current collector, where the current collector includes a support layer and a conductive layer arranged on at least one surface of the support layer. The thickness D2 of single side thickness of the conductive layer satisfies 30 nm≤D2≤3 μm, the material of the conductive layer is aluminum or aluminum alloy, and the density of the conductive layer is 2.5 g/cm$^3$ to 2.8 g/cm$^3$, and a primer layer including a conductive material and a binder is also arranged between the current collector and the electrode active material layer.

The current collector of the positive electrode piece of the present application is a composite current collector. Structurally, the current collector includes a support layer and a conductive layer arranged on at least one surface of the support layer. The thickness D2 of single side thickness of the conductive layer satisfies 30 nm≤D2≤3 μm. Therefore, the conductive layer plays a conductive role in the current collector. The thickness D2 of the conductive layer is much smaller than the thickness of metal current collectors such as Al foil commonly used in the prior art (the thickness of the commonly used Al foil is usually 12 μm), so that the mass energy density and volume energy density of electrochemical devices (such as lithium batteries) using the electrode piece can be improved. In addition, the composite current collector can also greatly improve the nail piercing safety performance of the electrode piece, because the composite current collector has a thin conductive layer, so the metal burrs produced in abnormal cases such as nail piercing is smaller, and it also has a support layer made of polymer material or polymer composite material, so the short circuit resistance is larger than that of the conventional metal current collector in abnormal cases such as nail piercing. The combined action of these factors greatly improves the nail piercing safety performance of the electrochemical device.

According to the research of the applicant, the conductive layer with high density and few defects can be obtained by improving the preparation process of the conductive layer, and the density of the conductive layer has great influence on the electrical properties of the current collector and electrode piece. Taking the positive current collector as an example, aluminum or aluminum alloy is usually used as the conductive layer of the current collector. When the density of the conductive layer is lower than that of 2.5 g/cm$^3$, the performance of the conductive layer is unstable, and it is easy to be damaged during processing, which seriously affects the conductivity of the conductive layer, resulting in poor conductivity and flow capacity of the current collector and the positive electrode piece. In order to improve the electrical performance of the composite current collector, the density of the composite positive current collector layer can be higher than 2.5 g/cm$^3$ by adjusting the preparation process conditions of the conductive layer (such as vacuum degree, atmosphere, humidity, temperature, etc.), thus obtaining a composite current collector with a high density conductive layer, which allows processing and manufacturing of positive electrode pieces with excellent flow capacity and conductivity. The density of the conductive layer of the composite positive current collector used in the present application can reach 2.5 g/cm$^3$ to 2.8 g/cm$^3$.

However, the increase of the density of conductive layer poses a new challenge to the safety of electrode pieces and electrochemical devices. It has been found that the increase of the density of conductive layer is not conducive to the nail piercing safety performance (needling performance) of electrode pieces and electrochemical devices. Therefore, in the positive electrode piece of the present application, the primer layer is arranged between the composite current collector and the electrode active material layer, which can increase the short-circuit resistance and effectively wrap the metal burrs that may be produced in the current collector under abnormal conditions such as nail piercing, so as to effectively improve the nail piercing safety performance of the electrochemical device. In addition, because the rebound degree of the composite current collector is larger than that of the conventional metal current collector, the combination between the current collector and the active material layer is easy to be destroyed in the process of electrode piece processing; the setting of the primer layer can increase the combination degree between the current collector and the active material layer, so that the electrode piece containing the composite current collector has small polarization and better electrochemical performance.

The following is a detailed description of the structure, material and performance of the positive electrode piece (and the current collector therein) and electrochemical device related to the embodiment of the present application.

[Conductive Layer of Current Collector]

Compared with the conventional metal current collector, in the current collector in the embodiment of the present application, the conductive layer plays the role of conducting and collecting current and is used to provide electrons for the electrode active material layer. In the present application, the material of the positive conductive layer of the current collector is selected from aluminum or aluminum alloy.

When the conductivity of the conductive layer is poor or the thickness is too small, the internal resistance and polarization of the battery will be larger, and when the thickness of the conductive layer is too large, it is not enough to improve the weight energy density and volume energy density of the battery, and it is not conducive to the improvement of safety performance of nail piercing.

The one-sided thickness of the conductive layer is D2 and D2 optionally satisfies 30 nm≤D2≤3 µm, optionally 300 nm≤D2≤2 µm, optionally 500 nm≤D2≤1.5 µm; so as to better ensure the lightweight performance of the current collector and have good electrical conductivity.

In the preferred embodiment of the present application, the upper limit of the one-side thickness D2 of the conductive layer can be 3 µm, 2.5 µm, 2 µm, 1.8 µm, 1.5 µm, 1.2 µm, 1 µm, 900 nm, the lower limit of the one-side thickness D2 of the conductive layer can be 800 nm, 700 nm, 600 nm, 500 nm, 450 nm, 400 nm, 350 nm, 300 nm, 100 nm, 50 nm, 30 nm; the range of the thickness D2 of one side of the conductive layer can be composed of any value of the upper limit or the lower limit. Optionally, 300 nm≤D2≤2 µm, and optionally 500 nm≤D2≤1.5 µm.

In order to obtain the positive electrode piece with excellent electrochemical performance, the density of the conductive layer in the present application is 2.5 g/cm³ to 2.8 g/cm³. Below the lower limit, the conductivity of the conductive layer is too poor, which will lead to poor flow capacity of current collector and positive electrode piece. In addition, below the lower limit, the formation quality of the conductive layer is too poor and unstable, and it is easy to be damaged, which will seriously affect the conductivity and flow capacity of current collector and electrode piece. Therefore, when the density of the conductive layer is 2.5 g/cm³ to 2.8 g/cm³, the positive electrode piece and electrochemical device of the present application can have better electrochemical performance.

It should be noted that due to the influence of the processing technology, the density of the conductive layer described in the present application may not be the same as the bulk density (real density) of the material used to prepare the conductive layer. The method for testing the density of the conductive layer described in the application is as follows:

the density of the conductive layer can be determined by the methods known in the art. As an example, the positive current collector with an area of 10 cm² is cut, and its mass is weighed by a balance accurate to 0.0001 g, calculated as $m_1$, unit is g, and the thickness of 20 positions is measured with a tenthousandth micrometer, and its average value is called $d_1$, in µm. Soaking the weighed positive collector in 1 mol/L NaOH aqueous solution for 1 minute, taking out the support layer after the conductive layer is completely dissolved, rinsing it with deionized water for 5 times, baking at 100° C. for 20 minutes, then weigh its mass with the same balance, recorded it as $m_2$, in g, measuring the thickness of 20 positions with the same tenthousandth micrometer, and taking the average value as $d_2$, in µm. Calculating the density of the conductive layer according to the following formula, in g/cm³.

$$\text{Density of conductive layer} = \frac{(m_1 - m_2)}{(d_1 - d_2)/1000}$$

When measuring, taking five positive current collectors with the same size to test the density of the conductive layer respectively, and taking the average value of the results.

Because the thickness of the conductive layer in the present application is small, cracks and other damage are easy to occur in the process of making electrode pieces. Generally, cracks exist in the conductive layer of the electrode piece described in the present application. The cracks in the conductive layer usually exist irregularly in the conductive layer, which can be long strip cracks, cross cracks, divergent cracks, etc., and can be a crack running through the whole conductive layer or a crack formed on the surface layer of the conductive layer. The cracks in the conductive layer are usually caused by rolling, excessive amplitude of welding tab and excessive winding tension of the substrate and so on in the process of electrode piece processing.

The conductive layer can be formed on the support layer by at least one of mechanical rolling, bonding, vapor deposition, electroless plating, electroplating, and the vapor deposition method is optionally physical vapor deposition (PVD). The physical vapor deposition method is optionally at least one of evaporation method and sputtering method; the evaporation method is optionally at least one of vacuum evaporating, thermal evaporation deposition and electron beam evaporation method (EBEM), and the sputtering method is optionally magnetron sputtering.

At least one of vapor deposition, electroplating or electroless plating is preferred to make the bonding between the support layer and the conductive layer firmer.

[Support Layer of Current Collector]

In the current collector of the embodiment of the present application, the support layer plays the role of supporting and protecting the conductive layer. Because the support layer is generally made of organic polymer materials or polymer composite material, the density of the support layer is usually less than that of the conductive layer, which can significantly improve the weight energy density of the battery compared with the conventional metal current collector.

Further, the metal layer with smaller thickness can further improve the weight and energy density of the battery. And because the support layer can play a good role in supporting and protecting the conductive layer on its surface, it is not easy to produce the electrode piece fracture phenomenon which is common in the conventional current collector.

The material of the support layer is selected from at least one of the insulating polymer material, the insulating polymer composite material, the conductive polymer material and the conductive polymer composite material.

The insulating polymer material is selected from at least one of polyamide, poly terephthalate, polyimide, polyethylene, polypropylene, polystyrene, polyvinyl chloride, aramid, polyphenylene diamide, acrylonitrile-butadiene-styrene copolymer, polybutylene terephthalate, poly(p-phenylene terephthalamide), polypropylene, polyformaldehyde, epoxy resin, phenolic resin, polytetrafluoroethylene, polyphenylene sulfide, polyvinylidene fluoride, silicone rubber, polycarbonate, cellulose and its derivatives, starch and its derivatives, protein and its derivatives, polyvinyl alcohol and its cross-linked products, polyethylene glycol and its cross-linked products.

The insulating polymer composite is selected, for example, from composite materials formed by insulating polymer materials and inorganic materials, where the inorganic materials are optionally at least one of ceramic materials, glass materials and ceramic composite materials.

The conductive polymer material is selected, for example, from poly(sulfur nitride) polymer materials or doped conjugated polymer materials, at least one of such as polypyrrole, polyacetylene, polyaniline, polythiophene, etc.

The conductive polymer composite material is selected from, for example, a composite material formed by insulating polymer materials and conductive materials, where the conductive materials are selected from at least one of conductive carbon materials, metal materials and composite conductive materials, where the conductive carbon materials are selected from at least one of carbon black, carbon nanotubes, graphite, acetylene black and graphene, and the metal materials are selected from at least one of nickel, iron, copper, aluminum or their alloys, and the composite conductive materials are selected from at least one of nickel-coated graphite powder and nickel-coated carbon fiber.

According to the actual needs and cost and other factors of the present application environment, the person skilled in the art can reasonably select and determine the materials of the support layer. The material of the support layer in the present application is optionally the insulating polymer material or the insulating polymer composite material, especially when the current collector is a positive current collector.

When the current collector is the positive current collector, the safety performance of the battery can be obviously improved by using the composite collector with insulating layer support and conductive layer with specific thickness. Since the insulating layer is non-conductive, its resistance is large, which can increase the short-circuit resistance of the battery under abnormal conditions and greatly reduce the short-circuit current, so the short-circuit heat generation can be greatly reduced, thus the safety performance of the battery can be improved; and the conductive layer is thin, so in abnormal cases such as nail piercing, the local conductive network is cut off to prevent the electrochemical device from being short-circuited in a large area or even the whole electrochemical device, so that the damage of the electrochemical device caused by nail penetration can be limited to the puncture site, and only a "point open circuit" is formed, without affecting the normal operation of the electrochemical device in a certain period of time.

The thickness of the support layer is D1, which optionally satisfying 1 µm≤D1≤20 µm, optionally 1 µm≤D1≤15 µm. And optionally 2 µm≤D1≤10 µm.

If the support layer is too thin, the mechanical strength of the support layer is not enough, and it is easy to break in the process of electrode piece processing; if the support layer is too thick, the volume energy density of the battery using the current collector will be reduced.

Among them, the upper limit of the thickness D1 of the support layer can be 20 µm, 15 µm, 12 µm, 10 µm, 8 µm, the lower limit can be 1 µm, 1.5 µm, 2 µm, 3 µm, 4 µm, 5 µm, 6 µm, 7 µm, and the range of the thickness D1 of the support layer can be composed of any value of the upper or lower limit. Optionally, 1 µm≤D1≤15 µm, optionally, 2 µm≤D1≤10 µm, and optionally, 3 µm≤D1≤8 µm.

At the same time, the specific thickness of the conductive layer in the present application can further ensure that the current collector has larger resistance, which significantly reduces the temperature rise of the battery when the internal short circuit occurs, when the conductive layer is aluminum or aluminum alloy, it can also significantly reduce or prevent the thermite reaction of the positive current collector, thus ensuring the good safety performance of the battery.

In addition, when the conductive layer is a metal conductive layer, it is preferable that the Young's modulus of the support layer at room temperature satisfies 20 GPa≥E≥4 GPa.

The method for testing the Young's modulus of the support layer at room temperature is as follows:

Cutting the sample of the support layer into 15 mm×200 mm, measuring the thickness of the sample h (µm) with tenthousandth micrometer, under normal temperature and pressure, using the high-speed rail tension machine to test, setting the initial position, and making the sample between clamps 50 mm long, the tension is carried out at the speed of 50 mm/min, recording the load L(N) stretched to break and the equipment displacement y (mm), then the stress ε=L/(15*h)*1000 and the strain η=y/50*100, drawing the stress-strain curve, and taking the initial linear zone curve, the slope of the curve is Young's modulus E.

Compared with polymer or polymer composite materials, metal has strong rigidity, i.e. less deformation in the rolling process of electrode piece processing. In order to ensure that the deformation difference between the support layer and the conductive layer is not too large to tear the conductive layer, the Young's modulus of the support layer at room temperature should optionally meet the following requirements 20 GPa≥E≥1.9 Gpa, optionally 20 GPa≥E≥4 Gpa, so that the support layer has certain rigidity, and the rigidity matching between the support layer and the conductive layer can be further improved, thereby ensuring that the deformation amounts of the support layer and the conductive layer will not be too different in the process of current collector and electrode piece.

Because the support layer has a certain rigidity (20 GPa≥E≥4 GPa), the current collector is not easy to deform or extend too much during the processing of current collector and electrode piece, which can make the connection between the support layer and the conductive layer is firm and not easy to separate, and can prevent the damage of the conductive layer caused by the "forced" extension of the conductive layer. And the current collector according to the present application has a certain toughness, so that the current collector and the electrode piece have a certain ability to withstand deformation, and are not easy to break the belt.

However, the Young's modulus of the support layer should not be too large, otherwise the rigidity is too strong, which will cause difficulties in rolling and winding, and poor processability. When 20 GPa≥E, the support layer can be guaranteed to be flexible, and the electrode piece can withstand deformation to a certain extent.

In addition, it is preferred that the thermal shrinkage of the support layer at 90° C. is not more than 1.5%, so that the thermal stability of the current collector can be better ensured in the process of electrode piece processing.

The elongation at break of the support layer B is more than 12%, optionally more than 15%, and optionally more than 30%. When abnormal conditions such as nail piercing occur in the electrochemical device, the burrs of the support layer can effectively cover the burrs of the conductive layer, thus improving the nail piercing safety performance of the electrochemical device. Especially, the ductility of the support layer is significantly greater than that of the conductive layer, and the conductive layer can be forced to extend when abnormal conditions such as nail piercing occur in the electrochemical device, and at the same time, the support layer is wrapped on the surface of the nail, which isolates the nail from the conductive layer, thus better cutting off the local conductive network, better limiting the damage to the electrochemical device caused by nail piercing, etc., and only forming a "point open circuit" without affecting the normal operation of the electrochemical device in a certain period of time.

The elongation at break of the support layer B is less than 10000%, optionally less than 400%, which is beneficial to make the support layer have a good supporting and protecting effect on the conductive layer and ensure the overall strength of the positive current collector.

The elongation at break of the support layer B can be measured by the method known in this field. As an example, the support layer is cut into a sample of 15 mm×200 mm, and the tensile test is carried out by using a high-speed rail tension machine at room temperature and pressure (25° C., 0.1 MPa). The initial position is set so that the sample length between the clamps is 50 mm, the tensile speed is 50 mm/min, and the equipment displacement y (mm) during tensile fracture is recorded. Finally, the elongation at break is calculated as B=(y/50)×100%.

The volume resistivity of the support layer is the volume resistivity at 20° C., which can be measured by the methods known in the art. As an example, the test is carried out in a room with constant temperature, normal pressure and low humidity (20° C., 0.1 mMpa, RH≤20%), and a wafer support layer sample with a diameter of 20 mm is prepared (the sample size can be adjusted according to the actual size of the testing instrument), the test is carried out by using the three-electrode surface resistivity method (GBT1410-2006) and the insulation resistance tester (precision 10Ω). The test method is as follows: the wafer sample is placed between two electrodes and a potential difference is applied between the two electrodes, the resulting current will be distributed in the body of the wafer sample and measured by picoammeter or electrometer, in order to avoid measurement errors caused by taking into account the surface leakage current in the measurement. The reading is the volume resistivity in Ω·m.

The material of the support layer in the present application is optionally an insulating polymer material or an insulating polymer composite material, so as to better improve the safety performance of battery nail piercing.

[Protective Layer of Current Collector]

In some preferred embodiments of the present application, the current collector is also provided with a protective layer, which is disposed on one surface or both surfaces of the conductive layer of the current collector, that is, the surface of the conductive layer away from the support layer and the surface facing the support layer.

The protective layer may be a metal protective layer or a metal oxide protective layer. The protective layer can prevent the conductive layer of the current collector from being damaged by chemical corrosion or mechanical damage, and can also enhance the mechanical strength of the collector, thus improving the flow capacity and electrochemical performance of the current collector and electrode piece.

Optionally, the protective layer is disposed on two surfaces of the conductive layer of the current collector. The lower protective layer of the conductive layer (i.e., the protective layer arranged on the surface of the conductive layer facing the support layer) can not only prevent the conductive layer from being damaged and enhance the mechanical strength of the current collector, but also enhance the bonding force between the support layer and the conductive layer and prevent stripping (i.e., separation of the support layer from the conductive layer).

The technical effect of the upper protective layer of the conductive layer (i.e., the protective layer arranged on the surface of the conductive layer far away from the support layer) is mainly to prevent the conductive layer from being destroyed and corroded during processing (for example, electrolyte immersion, rolling, etc., will affect the surface of the conductive layer).

Because of its good electrical conductivity, the metal protective layer can not only further improve the mechanical strength and corrosion resistance of the conductive layer, but also reduce the polarization of the electrode piece. The material of the metal protective layer is, for example, selected from at least one of nickel, chromium, nickel-based alloy and copper-based alloy, optionally nickel or nickel-based alloy.

Among them, the nickel-based alloy is an alloy formed by adding one or more other elements to pure nickel as the matrix. Optionally, it is a nickel-chromium alloy. The nickel-chromium alloy is an alloy formed of metallic nickel and metallic chromium. Optionally, the molar ratio of nickel to chromium is 1:99 to 99:1.

Copper-based alloy is an alloy formed by adding one or more other elements to pure copper as the matrix. Optionally, it is a copper-nickel alloy. Optionally, in the copper-nickel alloy, the molar ratio of nickel to copper is 1:99 to 99:1.

When metal oxide is selected as the protective layer, it can also effectively support and protect the conductive layer because of its small ductility, large specific surface area and high hardness, and has good technical effect on improving the bonding force between the support layer and the conductive layer. The material of the metal oxide protective layer is selected, for example, from at least one of alumina, cobalt oxide, chromium oxide and nickel oxide.

Metal oxides are optionally used in the protective layer of the positive composite current collector according to the present application, so as to achieve good technical effect of supporting and protection, and further improve the safety performance of the positive electrode piece and the battery.

The thickness of the protective layer is D3 and D3 optionally satisfies D3≤⅒D2 and 1 nm≤D3≤200 nm. If the protective layer is too thin, it is not enough to protect the conductive layer; if the protective layer is too thick, the weight energy density and volume energy density of the battery will be reduced. Optionally, 5 nm≤D3≤500 nm, optionally 10 nm≤D3≤200 nm, and optionally 10 nm≤D3≤50 nm.

The material of the protective layer on the two surfaces of the conductive layer can be the same or different, and the thickness can be the same or different. Optionally, both the upper protective layer and the lower protective layer are metal oxide protective layers.

Optionally, the thickness of the lower protective layer is less than that of the upper protective layer, so as to improve the weight energy density of the battery.

The thickness of the upper protective layer is $D_a$, 1 nm≤$D_a$≤200 nm and $D_a$≤0.1D2; the thickness of the lower protective layer is $D_b$, 1 nm≤$D_b$≤200 nm and $D_b$≤0.1D2; $D_a$≥$D_b$, optionally, 0.5$D_a$≤$D_b$≤0.8 $D_a$.

For the positive current collector, aluminum or aluminum alloy is used as the material of the conductive layer, and the metal oxide material is preferred for the lower protective layer. Compared with the metal used as the material of the lower protective layer, the metal oxide material has higher resistance, so this type of lower protective layer can further increase the resistance of the positive current collector to a certain extent. Thus further improving the short-circuit resistance when the battery is short-circuited under abnormal conditions and improving the safety performance of the battery. In addition, because the specific surface area of the metal oxide is larger, the bonding force between the lower protective layer and the support layer of the metal oxide material is enhanced; at the same time, because the specific surface area of the metal oxide is larger, the lower protective layer can increase the roughness of the surface of the support layer and enhance the bonding force between the conductive layer and the support layer, thereby improving the overall strength of the current collector.

[Structure of Current Collector]

FIGS. 1 to 4 show schematic diagrams of the structure of the current collector used in the positive electrode piece according to some embodiments of the present application.

In FIG. 1, the positive current collector 10 includes a positive current collector support layer 101 and a positive current collector conductive layer 102 disposed on two surfaces opposite to the positive current collector support layer 101, and also includes a positive current collector protective layer 103 arranged on the lower surface of the positive current collector conductive layer 102 (i.e. the face facing the positive current collector support layer 101), that is, the lower protective layer.

Figure 2:
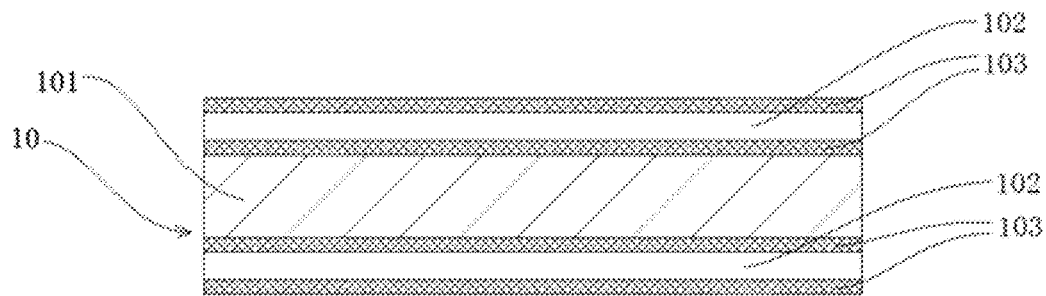
FIG. 2 is a schematic diagram of the cross-sectional structure of the positive current collector according to another specific embodiment of the present application.

In FIG. 2, the positive current collector 10 includes a positive current collector support layer 101 and a positive current collector conductive layer 102 arranged on two opposite surfaces of the positive current collector support layer 101, and also includes a positive current collector protective layer 103 arranged on the two opposite surfaces of the positive current collector conductive layer 102, that is, the lower protective layer and the upper protective layer.

Figure 3:
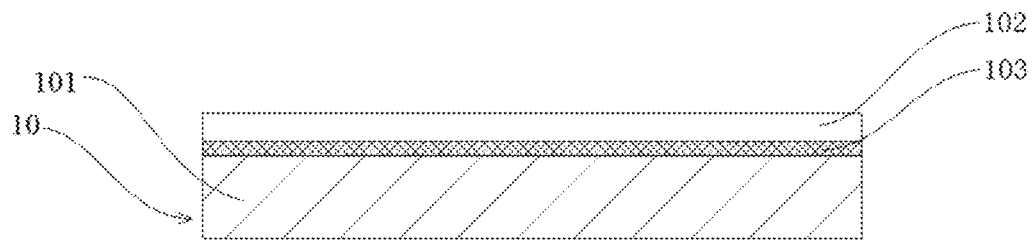
FIG. 3 is a schematic diagram of the cross-sectional structure of the positive current collector according to another specific embodiment of the present application.

In FIG. 3, the positive current collector 10 includes a positive electrode collector support layer 101 and a positive current collector conductive layer 102 disposed on one surface of the positive current collector support layer 101, and also includes a positive current collector protective layer 103, that is, a lower protective layer, arranged on the surface of the positive current collector conductive layer 102 facing the positive current collector support layer 101.

Figure 4:
FIG. 4 is a schematic diagram of the cross-sectional structure of the positive current collector according to another specific embodiment of the present application.

In FIG. 4, the positive current collector 10 includes a positive current collector support layer 101 and a positive current collector conductive layer 102 disposed on one surface of the positive current collector support layer 101, and also includes a positive current collector protective layer 103 arranged on two opposite surfaces of the positive current collector conductive layer 102, namely the lower protective layer and the upper protective layer.

The material and thicknesses of the protective layers on the two opposite surfaces of the conductive layer may be the same or different.

Among them, for the current collector used for the positive electrode piece according to the present application, as shown in FIGS. 1 and 2, conductive layers may be provided on both opposite surfaces of the support layer, or as shown in FIGS. 3 and 4, conductive layers may be provided on only one surface of the support layer. It should be understood that although only the lower protective layer is shown in FIGS. 3 and 4, only the upper protective layer can be formed on the surface of the conductive layer.

In addition, although the composite current collector used in the positive electrode piece of the present application optionally contains a current collector protective layer as shown in FIGS. 1 to 4, it should be understood that the current collector protective layer is not a necessary structure of the current collector, and the current collector used in some embodiments may not contain the current collector protective layer.

[Electrode Active Material Layer of Positive Electrode Piece]

The electrode active material layer used for the positive electrode piece of the present application can be selected from various conventional electrode active material layers commonly used in the art, and its composition and preparation method are well known in the art. The electrode active material layer usually includes electrode active material, binder and conductive agent. As needed, the electrode active material layer may also include other optional additives or auxiliary agents.

For the positive electrode piece of the present application, various electrode active materials commonly used in the art (that is, positive electrode active material) can be selected. For example, for lithium batteries, positive electrode active materials may be selected from lithium cobalt oxides, lithium nickel oxides, lithium manganese oxides, lithium nickel manganese oxide, lithium nickel cobalt manganese oxide, lithium nickel cobalt aluminum oxides, transition metal phosphates, lithium ferric phosphate, etc., but the present application is not limited to these materials, and other conventional well-known materials that can be used as positive active materials for lithium ion batteries can also be used. These positive electrode active materials may be used alone or in combination of two or more. Optionally, positive electrode active materials can be selected from one or more of LiCoO2, LiNiO2, LiMnO2, LiMn2O4, $LiNi_{1/3}Co_{1/3}Mn_{1/3}O_2$(NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, LiFePO4, LiMnPO4.

For the positive electrode piece of the present application, it is preferable that the average particle size D50 of the active material in the electrode active material layer is 5 to 15 μm. If D50 is too small, the porosity of the electrode is small after compaction, which is not conducive to the infiltration of the electrolyte, and its larger specific surface area is easy to produce more side reactions with the electrolyte, which reduce the reliability of the electrode assembly; If D50 is too large, it is easy to cause great damage to the primer layer and the composite current collector in the process of electrode piece compaction. D50 refers to the corresponding particle size when the cumulative volume percentage of the active material reaches 50%, that is, the median particle size of the volume distribution. The D50 can be measured, for example, using a laser diffraction particle size distribution meter (such as Malvern Mastersizer 3000).

For the positive electrode piece of the present application, various conductive agents, binders or other optional additives or auxiliary agents commonly used in the art can be selected.

The conductive agent in the electrode active material layer may be at least one of conductive carbon material and metal material; where the conductive carbon material is selected from zero-dimensional conductive carbon, such as acetylene black and conductive carbon black; one-dimensional conductive carbon, such as carbon nanotubes; two-dimensional conductive carbon, such as conductive graphite and graphene; three-dimensional conductive carbon, such as at least one of reduced graphene oxide; the metal material is selected from at least one of aluminum powder, iron powder and silver powder.

The binders in the electrode active material layer can be selected from at least one of styrene-butadiene rubber, oil soluble polyvinylidene fluoride (PVDF), polyvinylidene fluoride copolymers (such as PVDF-HFP copolymers, PVDF-TFE copolymers), sodium carboxymethyl cellulose, polystyrene, poly acrylic acid, polytetrafluoroethylene, polyacrylonitrile, polyimide, water soluble PVDF, polyurethane, polyvinyl alcohol, polyacrylate, polyacrylic acid-polyacrylonitrile copolymer, polyacrylate-polyacrylonitrile copolymer.

The person skilled in the art are familiar with that the paste composed of electrode active material, conductive agent and binder is coated on the electrode current collector (or pre-coated on the primer layer of the electrode current collector), and then the required electrode active material layer can be obtained after drying and other post-treatment.

The conventional electrode piece can be coated with one or more electrode active material layers, but no matter single layer coating or multi-layer coating, the electrode active material layer is generally uniformly coated in the whole coating area of the surface of the electrode piece, and the cold pressing (rolling) operation is also carried out for the surface the electrode piece as a whole, so the compaction density of the electrode active material layer on the obtained electrode piece is basically the same without obvious difference.

In the present application, because the support layer of the composite current collector is made of polymer material or polymer composite material, its rebound degree is larger than that of the conventional metal current collector in the process of electrode piece processing (such as rolling process, etc.), so if the current collector is coated and then compacted by rolling process according to the conventional process, a series of problems may be caused. Because of the rebound of the support layer, the edges on both sides of the electrode piece will be tilted up, which will make the whole electrode piece produce radian, thus leading to the deformation of the electrode piece. The deformation of the electrode may lead to the separation of the electrode active material layer from the composite current collector, the damage of the conductive layer, the peeling of the conductive layer from the support layer, etc., and further deteriorate the electrochemical performance of the electrode piece. On the other hand, the deformation of the electrode pieces will make the positive and negative electrode pieces unable to align accurately. Therefore, the electrode pieces made of composite current collector is easy to produce some technical problems, such as large internal resistance and large polarization.

In the positive electrode piece according to some preferred embodiments of the present application, the electrode active material layer includes 2n+1 (n=1, 2 or 3) regions based on the compaction density from the direction of the width of the coated surface of the electrode piece, and the compaction density of the middle region is higher than that of the two side regions, and optionally n=1. Taking the preferred embodiment as an example, the electrode active material layer includes three regions based on the compaction density, and the compaction density of the middle region is higher than that of the two side regions. After cold pressing (rolling) and other processes, the compaction density on both sides of the electrode piece is low, while the compaction density of the middle area is high, that is, the pressure on both sides of the electrode piece is less than that in the middle area during cold pressing (rolling) and other processes, thus avoiding the edge warping and radian of the composite current collector and electrode piece easily caused by the rebound of the composite current collector in the electrode piece processing process, which is beneficial to the formation of the electrode piece with a smooth surface, thus being beneficial to ensuring the electrochemical performance of the electrochemical device, and is favorable for protecting the conductive layer from being damaged, thereby ensuring good flow capacity of the electrode piece.

In the present application, the "longitudinal direction" and "width direction" of the electrode piece surface respectively refer to the two dimensions of the surface, in which the longitudinal direction refers to the main dimension direction (that is, the direction of larger size), and the width direction refers to the secondary dimension direction (that is, the direction of smaller size). In general, the longitudinal direction is consistent with the coating direction of each material layer (such as the electrode active material layer) in the process of electrode piece processing, and also consistent with the winding direction of the electrode piece in the process of electrochemical device (such as battery) manufacturing; and the width direction is perpendicular to the longitudinal direction.

In order to form the three regions of the active material layer based on the compaction density according to the present application, the method of zone coating can be used, that is, the baffle or gasket is used to divide different regions (or boundaries) on the surface of the electrode piece. Each area is coated with electrode active material paste of different weight, so that the active material layer area with different compaction density is formed after rolling. In addition, the compaction density of the two sides is optionally the same, and this design is beneficial to better ensure the flatness of the electrode piece.

Figure 7:
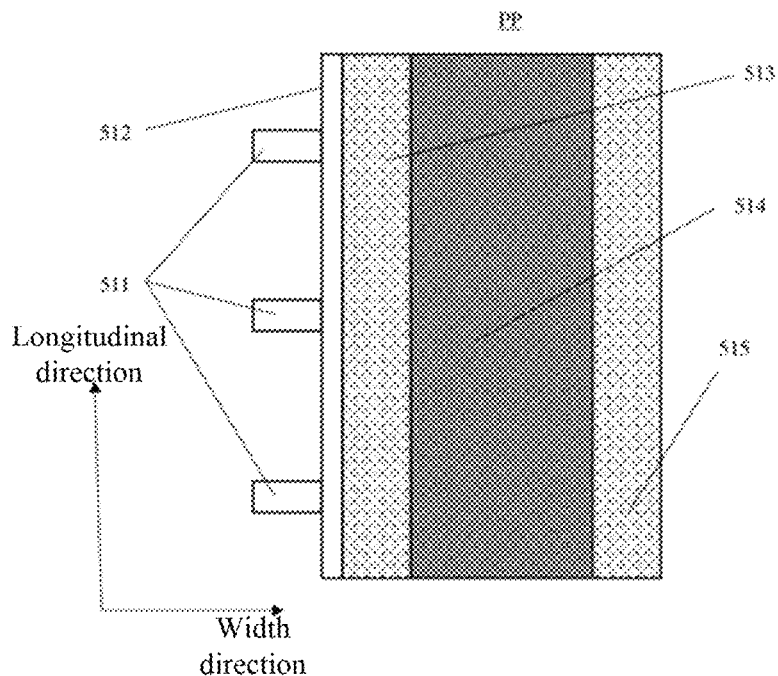
FIG. 7 shows a schematic top view of the positive electrode piece according to some embodiments of the present application.

FIG. 7 shows a schematic top view of the positive electrode piece according to some embodiments of the present application. The positive electrode piece PP includes an electrode piece body and one or more electrode tabs 511 electrically connected with it; according to the different layers of the coated electrode active material, the electrode piece body includes four regions: an extension region 512 directly connected with the electrode tab 511 (an region not coated by the electrode active material layer), a first low-pressure compaction region 513, a high-pressure compaction region 514 and a second low-pressure compaction region 515. That is, as viewed from the width direction of the coated surface of the positive electrode piece PP, the electrode active material layer includes three regions based on the compaction density. And the compaction density of 514 in the middle area is higher than that of 513 and 515 on the two sides.

In the present application, the ratio of the middle high-pressure compaction area to the total coating area (in this example, the ratio of the width of 514 to the sum of the width of 513+the width of 514+the width of 515) can be, for example, 20-80%, optionally 30-70%, optionally 40-60%, or optionally 45-55%. The widths of the two low compaction areas can be the same or different, preferably the same.

In the present application, the compaction density of the low-pressure compaction area may be about 5-30%, such as 7-25%, such as 8-20%, such as 8-18% lower than that of the high compaction area.

In the positive electrode piece according to some preferred embodiments of the present application, based on the total weight of the electrode active material layer, the binder content in the electrode active material layer is optionally not less than 1 wt %, optionally not less than 1.5 wt %, and optionally not less than 2 wt %. For the positive electrode piece in the present application, when the content of binder in the electrode active material layer is high, the binding force between the active material layer and the composite current collector can be enhanced, so that the deterioration of the binding force between the composite current collector and the electrode active material layer caused by the large rebound of the support layer in the processing process can be suppressed, thus ensuring that the electrode active material layer is not easy to separate from the composite current collector. If the binding force between the two is not enough, the internal resistance of the battery is larger, the polarization is increased, and the electrochemical performance is poor. In addition, the high binding force makes the active material layer can effectively wrap the metal burrs in the conductive layer under abnormal conditions such as nail piercing, so as to improve the nail piercing safety performance of the battery. If the binder content is kept within this range, the binding force between the active material layer and the current collector is better, so that in abnormal cases such as nail piercing, the active material layer can wrap the metal burrs produced in the conductive layer more effectively, to improve the nail piercing safety performance of the battery.

[Primer Layer]

In the positive electrode piece of the present application, a primer layer is also provided between the current collector and the electrode active material layer. The primer layer contains conductive material and binder.

Based on the total weight of the primer layer, the weight percentage content of the binder is 30%-99%, optionally 50%-99%, and optionally 80%-99%; the weight percentage content of the conductive material is 1%-70%, optionally 1%-50%, and optionally 1%-20%. This ratio can not only help to improve the nail piercing safety performance of the electrode piece and the electrochemical device, but also improve the binding force between the current collector and the electrode active material layer.

The conductive material is at least one of conductive carbon material and metal material;

Among them, the conductive carbon material is selected at least from one of zero-dimensional conductive carbon (such as acetylene black and conductive carbon black), one-dimensional conductive carbon (such as carbon nanotubes), two-dimensional conductive carbon (such as conductive graphite and graphene), and three-dimensional conductive carbon (such as reduced graphene oxide). The metal material is selected from at least one of aluminum powder, iron powder and silver powder.

The conductive material optionally contains one-dimensional conductive carbon and/or two-dimensional conductive carbon material. The one-dimensional conductive material is for example the one-dimensional conductive carbon (such as carbon nanotubes, etc.), two-dimensional conductive material is for example the two-dimensional conductive carbon (such as flake conductive graphite, graphene, etc.).

After adding the two-dimensional conductive carbon material, the two-dimensional conductive carbon material in the primer layer can produce "horizontal sliding" during the compaction process of the electrode piece, thus playing a buffering role, reducing the damage to the conductive layer of the current collector during the compaction process, and thus reduce cracks. The preferred particle size D50 of the two-dimensional conductive carbon material is 0.01-0.1 μm.

Optionally, the two-dimensional conductive carbon material accounts for 1 wt %-50 wt % of the conductive material.

The morphology of one-dimensional conductive material is special, so it can improve the electrical conductivity of the primer layer. In particular, when the amount of conductive material is fixed, one-dimensional conductive material can improve the conductivity of the primer layer better than other types of conductive materials. Carbon nanotubes is preferred, the length-diameter ratio of the carbon nanotubes is 1000 to 5000.

In a preferred embodiment, the conductive agent contains a one-dimensional conductive material and/or a two-dimensional conductive carbon material.

Optionally, the one-dimensional conductive material and/or the two-dimensional conductive carbon material accounts for 1 wt %-50 wt % of the conductive agent.

In another preferred embodiment, the conductive agent is a combination of the one-dimensional conductive carbon material and the zero-dimensional conductive carbon material. One-dimensional carbon (such as carbon nanotubes) and zero-dimensional carbon (such as acetylene black carbon ball) can be combined by points and lines to form a uniform conductive network, which can effectively enhance the electrical conductivity of the primer layer. In another preferred embodiment, the conductive agent is a combination of the two-dimensional conductive carbon material and the zero-dimensional conductive carbon material. Two-dimensional carbon (such as flake conductive graphite) and zero-dimensional carbon (such as acetylene black carbon ball) can be combined by points and surfaces to form a uniform conductive network, which can effectively enhance the electrical conductivity of the primer layer.

The binder is selected from at least one of styrene-butadiene rubber, oil soluble polyvinylidene fluoride (PVDF), polyvinylidene fluoride copolymers (such as PVDF-HFP copolymers, PVDF-TFE copolymers), sodium carboxymethyl cellulose, polystyrene, polyacrylic acid, polytetrafluoroethylene, polyacrylonitrile, polyimide, water soluble PVDF, polyurethane, polyvinyl alcohol, polyacrylate, polyacrylic acid-polyacrylonitrile copolymer, and polyacrylate-polyacrylonitrile copolymer.

The binder is optionally a water soluble binder, such as at least one of water soluble PVDF, polyacrylic acid, polyurethane, polyvinyl alcohol, polyacrylate, polyacrylic acid-polyacrylonitrile copolymer, and polyacrylate-polyacrylonitrile copolymer, in this way, the direct current resistance (DCR) growth of the electrochemical device is small.

In the present application, the "water soluble" polymer material refers to the polymer molecular chain completely extended and dispersed in water, and the "oil soluble" polymer material refers to the polymer molecular chain fully extended and dispersed in the oily solvent. The person skilled in the art would understand that the same kind of polymer materials can be dispersed in water and oil respectively by using suitable surfactants, that is, by using suitable surfactants, the same kind of polymer materials can be made into water soluble polymer materials and oil soluble polymer materials respectively. For example, those skilled in the art could modify PVDF to water soluble PVDF or oil soluble PVDF as needed.

The one-sided thickness of the primer layer H is optionally 0.1 to 5 μm. If the thickness is too small, it cannot effectively improve the safety of nail piercing; if the thickness is too large, it will not only reduce the weight energy density of the battery, but also increase the DCR of the battery, which is not conducive to the improvement of the dynamic performance of the battery.

[Positive Electrode Piece]

The positive electrode piece of the battery described in the present application can be formed by a conventional method.

Figure 5:
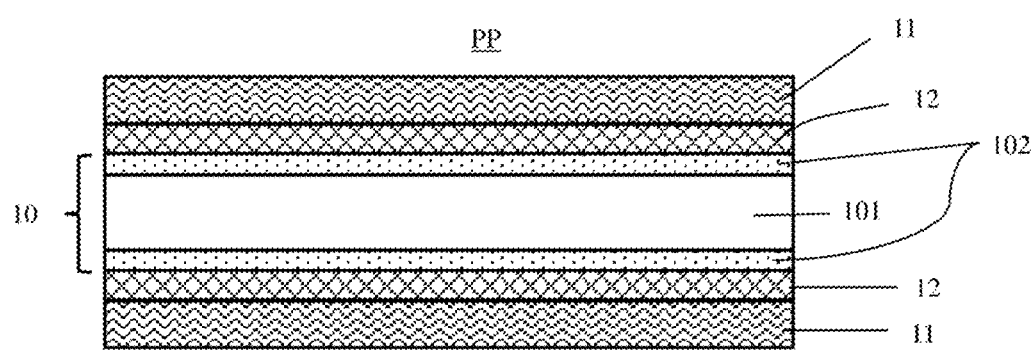
FIG. 5 is a schematic diagram of the structure of the positive electrode piece according to a specific embodiment of the present application.
Figure 6:
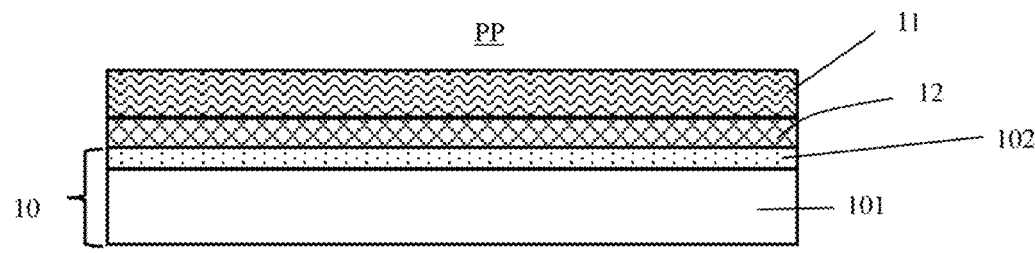
FIG. 6 is a schematic diagram of the structure of the positive electrode piece according to another specific embodiment of the present application.

FIG. 5 and FIG. 6 schematically show the structure diagram of the positive electrode piece according to some embodiments of the present application.

In FIG. 5, the positive electrode piece PP includes a positive current collector 10, a primer layer 12 and an electrode active material layer 11 (i.e., a positive active material layer) disposed on two opposite surfaces of the positive current collector 10, and the positive current collector 10 includes a positive current collector support layer 101, a positive current collector conductive layer 102 provided on two opposite surfaces of the positive current collector support layer 101, and a positive current collector protective layer 103 provided on one or both sides of the positive current collector conductive layer 102 (not shown in the figure).

In FIG. 6, the positive electrode piece PP includes a positive current collector 10, a primer layer 12 and an electrode active material layer 11 (i.e., a positive active material layer) disposed on one surface of the positive current collector 10. The positive current collector 10 includes a positive current collector support layer 101, a positive current collector conductive layer 102 arranged on one surface of the positive current collector support layer 101 and a positive current collector protective layer 103 arranged on one or both sides of the positive current collector conductive layer 102 (not shown in the figure).

As shown in FIGS. 5 and 6, the primer layer and the electrode active material layer can be arranged on one surface of the current collector or on the two surfaces of the current collector.

The person skilled in the art could understand that when using a current collector with a double-sided conductive layer, the electrode piece can be coated on both sides (that is, the electrode active material layer can be set on two surfaces of the current collector). It can also be coated only on one side (that is, the electrode active material layer is only arranged on one surface of the current collector); and when the current collector is provided with only one-sided conductive layer, the electrode piece can only be coated on one side, and the electrode active material layer (and the primer layer) can only be coated on the side of the current collector with conductive layer.

[Electrochemical Device of Present Application]

The electrochemical device of the present application may be, for example, a battery, and may include a positive electrode piece as described above, an isolation membrane and a negative electrode piece. The negative electrode piece used in cooperation with the positive electrode piece according to the present application can choose various conventional negative electrode pieces commonly used in the field, and their composition and preparation methods are well known in the field. For example, the negative electrode piece may include a negative current collector and a negative active material layer arranged on the negative current collector, and the negative electrode active material layer may include a negative active material, a binder, a conductive material, and the like. The negative active materials are, for example, carbonaceous materials such as graphite (artificial graphite or natural graphite), conductive carbon black, carbon fiber, etc., such as metal or semi-metallic materials such as Si, Sn, Ge, Bi, Sn, In or their alloys, lithium-containing nitride or lithium-containing oxide, lithium metal or lithium aluminum alloy, etc. The negative current collector can use conventional metal foil or composite current collector.

The isolation membrane of the battery used in the present application can choose various isolation membranes commonly used in the art.

The battery of the present application usually also includes an electrolytic solution. Various electrolytic solutions commonly used in the art can be selected, such as solutions of electrolyte salts in non-aqueous solvents. For example, for a lithium battery, a mixed solution of an electrolyte lithium salt and a non-aqueous solvent may be used. The electrolyte lithium salt can be selected from one or more of lithium hexafluorophosphate (LiPF6), lithium perchlorate, lithium tetrafluoroborate, lithium hexafluoroarsenate, lithium halide, lithium chloroaluminate and lithium fluoroalkyl sulfonate. The organic solvent can be selected from chain carbonate, cyclic carbonate or their mixed solvent. The chain carbonate can be at least one of dimethyl carbonate (DMC), diethyl carbonate (DEC), methyl ethyl carbonate (EMC), methyl propyl carbonate (MPC), dipropyl carbonate (DPC) and other chain organic esters containing fluorine, sulfur or unsaturated bonds. The cyclic carbonate can be one or more of ethylene carbonate (EC), propylene carbonate (PC), vinylene carbonate (VC), γ-butyrolactone (γ-BL), sultone and other cyclic organic esters containing fluorine, sulfur or unsaturated bonds.

The battery of the present application can be a primary battery or a secondary battery. The battery of the present application may be a lithium-ion battery or a sodium-ion battery, optionally a lithium-ion battery, such as a lithium-ion primary battery or a lithium-ion secondary battery. In addition to the use of the positive electrode piece described above, the construction and preparation of these batteries themselves are well known. Due to the use of the positive electrode piece described above, the battery can have improved safety (such as nail piercing safety), energy density and electrical performance And the positive electrode piece according to the present application is easy to process, so the manufacturing cost of the battery using the positive electrode piece according to the present application can be reduced.

In some embodiments, the electrochemical device may include an outer package for packaging the positive electrode piece, the negative electrode piece and the electrolyte. As an example, the positive electrode piece, the negative electrode piece and the isolation membrane can be laminated or wound to form a laminated structure electrode assembly or a wound structure electrode assembly, the electrode assembly is packaged in the outer package; the electrolytic solution can be used as the electrolyte, and the electrolyte is soaked in the electrode assembly. The number of electrode assemblies in the electrochemical device can be one or several, which can be adjusted according to the demand.

In some embodiments, the outer package of the electrochemical device may be a soft package, such as a bag-type soft package. The material of the soft package may be plastic, such as one or more of polypropylene PP, polybutylene terephthalate PBT, polybutylene succinate PBS, etc. The outer packaging of electrochemical device can also be a hard shell, such as an aluminum shell.

Figure 8:
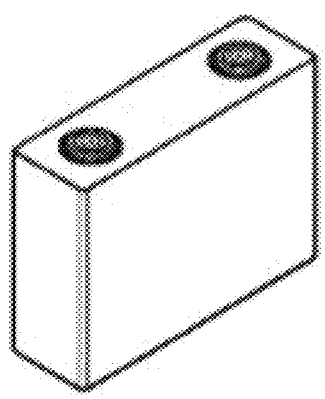
FIG. 8 is a schematic diagram of an embodiment of the electrochemical device of the present application.

In the present application, there is no special restriction on the shape of the electrochemical device, which can be cylindrical, square or any other shape. FIG. 8 is an electrochemical device 5 with a square structure as an example.

In some embodiments, the electrochemical device can be assembled into a battery module, and the number of electrochemical devices contained in the battery module can be multiple, and the specific number can be adjusted according to the application and capacity of the battery module.

Figure 9:
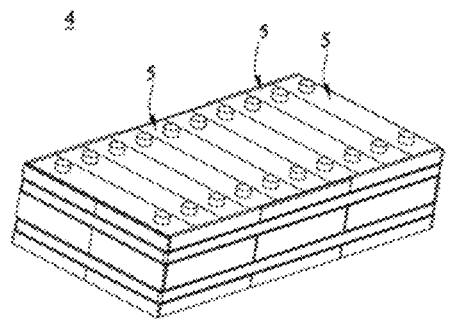
FIG. 9 is a schematic diagram of an embodiment of a battery module of the present application.

FIG. 9 is a battery module 4 as an example. Referring to FIG. 9, in the battery module 4, a plurality of electrochemical devices 5 may be arranged sequentially along the longitudinal direction of the battery module 4. Of course, it can also be arranged in any other way. Further, multiple electrochemical devices 5 may be fixed by fasteners.

Optionally, the battery module 4 may also include a shell having a holding space in which multiple electrochemical devices 5 are accommodated.

In some embodiments, the battery modules can also be assembled into a battery pack, and the number of battery modules contained in the battery pack can be adjusted according to the application and capacity of the battery pack.

Figure 10:
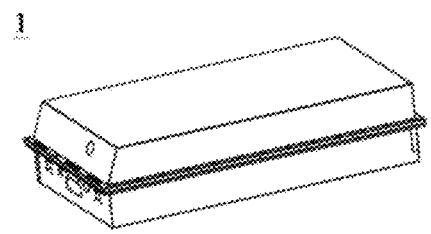
FIG. 10 is a schematic diagram of an embodiment of a battery pack of the present application.
Figure 11:
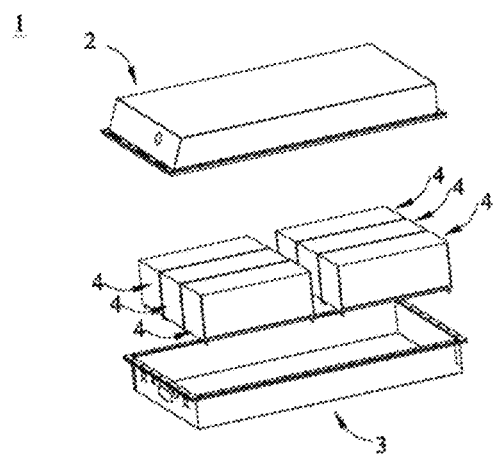
FIG. 11 is a decomposition diagram of FIG. 10.

FIGS. 10 and 11 show a battery pack 1 as an example. Referring to FIGS. 10 and 11, the battery pack 1 may include a battery box and a plurality of battery modules 4 disposed in the battery box. The battery box includes an upper box 2 and a lower box 3, and the upper box 2 can cover the lower box 3 and form a closed space for accommodating the battery module 4. A plurality of battery modules 4 may be arranged in the battery box in any manner.

[Apparatus]

The third aspect of the present application relates to a device, including the electrochemical device described in the second aspect of the present application. The electrochemical device can be used as a power source of the apparatus or as an energy storage unit of the apparatus. The apparatus may, but are not limited to, mobile apparatuses (such as mobile phones, notebook computers, etc.), electric vehicles (such as pure electric vehicles, hybrid electric vehicles, plug-in hybrid electric vehicles, electric bicycles, electric scooters, electric golf carts, electric trucks, etc.), electric trains, ships and satellites, and energy storage systems, etc. In addition, electric trains, ships and satellites are all vehicles, which belong to vehicle in a broad sense.

The apparatus can select an electrochemical device, a battery module or a battery package according to its use requirements.

Figure 12:
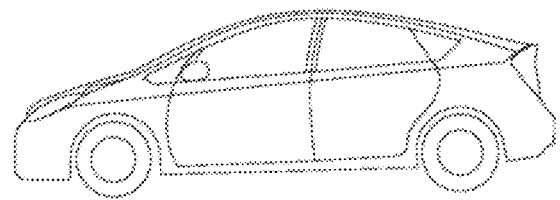
FIG. 12 is a schematic diagram of an embodiment of the electrochemical device as a power source in the present application.

FIG. 12 is an apparatus as an example. The apparatus can be a pure electric vehicle, a hybrid electric vehicle, or a plug-in hybrid electric vehicle, etc. In order to meet the requirements of the apparatus for high power and high energy density of electrochemical devices, the battery pack or battery module can be used.

As another example, the apparatus can be a mobile phone, a tablet, a laptop, and so on. The apparatus usually requires light and thin, and the electrochemical device can be used as the power supply.

The person skilled in the art could understand that in the above-mentioned different embodiments of the present application, various restrictions or preferred ranges for the selection of components, component content and material physical and chemical property parameters (thickness, particle size, specific surface area, elongation at break, etc.) can be arbitrarily combined, and the various embodiments obtained from the combination are still within the scope of the present application and are regarded as part of the disclosure of the specification.

Embodiments

In order to make the application purpose, technical solution and beneficial technical effect of the present application more clear, the following is combined with the embodiment to further describe the present application in detail. It should be understood, that the embodiments of the present application are only for the purpose of interpreting the present application, not for limiting the present application, and that the embodiments of the present application are not limited to the embodiments given in the specification. The experimental conditions not specified in the embodiment adopt conventional conditions or conditions recommended by material suppliers or equipment suppliers.

Preparation method of the current collector used in each embodiment and comparative example of the positive electrode piece is as follows:

1. Preparation of current collector without protective layer:

Selecting a certain thickness of the support layer, and forming a certain thickness of conductive layer on its surface by vacuum evaporation, mechanical rolling or bonding.

Among them, (1) The formation conditions of vacuum evaporation are as follows: the support layer with surface cleaning treatment is placed in the vacuum plating chamber, and the high purity wire in the metal evaporation chamber is melted and evaporated at a high temperature of 1600° C. to 2000° C. The evaporated metal passes through the cooling system in the vacuum plating chamber, and finally deposited on the surface of the support layer to form a conductive layer.

(2) The forming conditions of the mechanical rolling method are as follows: placing the foil of conductive layer material in a mechanical roller, rolling it to a predetermined thickness by applying a pressure of 20 t-40 t, then placing it on the surface of the support layer after surface cleaning treatment, finally placing the two in the mechanical roller, and applying a pressure of 30 t-50 t to make them tightly bonded.

(3) The forming conditions of the bonding mode are as follows: placing the foil of the conductive layer material in a mechanical roller, and rolling the foil into a predetermined thickness by applying a pressure of 20 t to 40 t; then coating a mixed solution of PVDF and NMP on the surface of the support layer after surface cleaning treatment; finally, the conductive layer with the predetermined thickness is bonded to the surface of the support layer and dried at 100° C.

2. Preparation of Current Collector with a Protective Layer:

The current collector with protective layer can be prepared in the following ways:

(1) firstly, a protective layer is arranged on the surface of the support layer by vapor deposition or coating, and then a conductive layer with a certain thickness is formed on the surface of the support layer by vacuum evaporation, mechanical rolling or bonding, to prepare a current collector with a protective layer (the protective layer is located between the support layer and the conductive layer). In addition, on the basis of the above, another protective layer can be formed on the surface of the conductive layer away from the support layer by vapor deposition, in-situ formation or coating to prepare a current collector with a protective layer (the protective layer is located on two opposite surfaces of the conductive layer);

(2) forming a protective layer on one surface of the conductive layer by vapor deposition, in-situ formation or coating, and then arranging the conductive layer with the protective layer on the surface of the support layer by mechanical rolling or bonding, and the protective layer is arranged between the supporting layer and the conductive layer, so as to prepare a current collector with the protective layer (the protective layer is located between the support layer and the conductive layer); in addition, on the basis of the above, another protective layer can be formed on the surface of the conductive layer away from the support layer by vapor deposition, in-situ formation or coating to prepare a current collector with protective layers (the protective layers are located on two opposite surfaces of the conductive layer);

(3) firstly, a protective layer is formed on one surface of the conductive layer by vapor deposition, in-situ formation or coating, and then by mechanical rolling or bonding, the conductive layer with the protective layer is arranged on the surface of the support layer, and the protective layer is arranged on the surface away from the support layer to prepare a current collector with the protective layer (the protective layer is located on the surface away from the supporting layer);

(4) firstly, forming protective layers on two surfaces of the conductive layer by vapor deposition, in-situ forming or coating method, and then arranging the conductive layer with the protective layers on the surface of the support layer by mechanical rolling or bonding method to prepare a current collector with protective layers (the protective layers are positioned on two opposite surfaces of the conductive layer);

(5) On the basis of the above-mentioned "preparation of current collector without protective layer", another protective layer is formed on the surface of the conductive layer away from the support layer by vapor deposition, in-situ formation or coating method to prepare a current collector with a protective layer (the protective layer is located on the surface away from the support layer).

In the preparation instance, the vacuum evaporation method adopts the vapor deposition method, the in-situ formation method adopts the in-situ passivation method, and the coating method adopts the scraper coating method.

The forming conditions of vacuum evaporation are as follows: the sample after surface cleaning is placed in the vacuum plating chamber, and the protective layer material in the evaporation chamber is melted and evaporated at a high temperature of 1600° C. to 2000° C., the evaporated protective layer material passes through the cooling system in the vacuum plating chamber, and finally is deposited on the surface of the sample to form a protective layer.

The formation conditions of the in-situ passivation method are as follows: the conductive layer is placed in the high temperature oxidation environment, the temperature is controlled between 160° C. to 250° C., while the oxygen supply is maintained in the high temperature environment, and the treatment time is 30 minutes, so as to form a protective layer of metal oxides.

The formation conditions of the gravure coating method are as follows: the protective layer material is stirred and mixed with NMP, and then the slurry of the above protective layer material (solid content is 20% to 75%) is coated on the sample surface, and then the thickness of the coating is controlled by a gravure roller, and finally dried at 100° C. to 130° C.

3. Preparation of the Electrode Piece:

1) The positive electrode piece of the embodiment:

A certain proportion of conductive material (such as conductive carbon black) and binder (such as PVDF or polyacrylic acid, etc.) are dissolved in an appropriate solvent (such as NMP or water) and stirred evenly to form a primer slurry.

The primer slurry is uniformly double-sided coated on the composite current collector prepared according to the above method, the coating speed is 20 m/min, and the primer layer is dried, the oven temperature is 70 mm to 100° C. and the drying time is 5 min.

After the primer layer is completely dried, 92 wt % of positive active material, 5 wt % of conductive agent Super-P (referred to as "SP") and 3 wt % PVDF are stirred evenly to form a positive active material layer slurry with NMP as solvent, and the positive active material layer slurry is coated on the surface of the primer layer by extrusion coating; the positive active material layer is obtained after drying at 85° C.

Then, the current collector with each coating is cold pressed, then cut, and dried for 4 hours at 85° C. under vacuum condition, and the tab is welded to obtain the positive electrode piece.

2) Comparative Positive Electrode Piece:

It is prepared similarly to the preparation method of the positive electrode piece in the above embodiment, but in which the positive active material layer slurry is directly coated on the surface of the composite current collector, and no primer layer is provided.

3) Conventional Positive Electrode Piece:

The current collector is an Al foil with a thickness of 12 μm. Similar to the preparation method of the positive electrode piece compared above, the positive active material layer slurry is directly coated on the surface of the Al foil current collector, and then the conventional positive electrode piece is obtained by post-treatment.

4. Preparation of Negative Electrode Piece:

The negative electrode piece: active substance graphite, conductive agent Super-P, thickener CMC and adhesive SBR are added into the solvent deionized water according to the mass ratio of 96.5:1.0:1.0:1.5, and mixed evenly to prepare anode slurry; the anode slurry is coated on the surface of the copper foil of the negative current collector, dried at 85° C., then trimmed, sliced and divided into strips, dried at 110° C. under vacuum condition for 4 hours, and the tab is welded to make the negative electrode piece of the secondary battery that meets the requirements.

5. Preparation of Electrolytic Solution

Vinyl carbonate (EC), methyl ethyl carbonate (EMC) and diethyl carbonate (DEC) were mixed according to 3:5:2 volume ratio to obtain EC/EMC/DEC mixed solvent, and then a fully dried lithium salt $LiPF_6$ was dissolved in the mixed solvent to obtain a solution with a concentration of 1M, thus obtaining an electrolytic solution.

6. Preparation of Battery

The polypropylene film of 12 μm is used as the isolation membrane, and the positive electrode piece, the isolation membrane and the negative electrode piece are folded sequentially, so that the isolation membrane is placed between the positive electrode piece and negative electrode piece to play an isolation role, and then wound into an electrode assembly. Vacuum baking at 75° C. for 10 hours, injecting the electrolytic solution (prepared according to those described in "Preparation of Electrolytic Solution" above), vacuum packaging and resting for 24 hours, then charging to 4.2V with a constant current of 0.1 C, then charging with constant voltage of 4.2V until the current drops to 0.05 C, then discharging to 3.0V at a constant current of 0.1 C, repeating the charging and the discharging twice, and finally charging to 3.8V at a constant current of 0.1 C, to complete the preparation of the secondary battery.

7. Battery Test Methods:

1) Acupuncture Test:

At 25° C., the lithium ion secondary battery was charged to 4.2V at a constant current of 1 C, and then charged at a constant voltage until the current was less than or equal to 0.05 C. Then, a steel needle with a diameter of 8 mm is pierced through the whole lithium ion secondary battery at the speed of 25 mm/s, and the steel needle is retained in the lithium ion secondary battery to monitor the changes in temperature and voltage of the lithium-ion secondary battery.

Test of Battery Temperature: using a multi-channel thermometer, a temperature sensing line is attached to the geometric centers of the needle-punched surface and the back of the battery to be nailed, and after nailing is completed, the battery temperature is tracked for five minutes, and then recording the battery temperature in five minutes to get the temperature rise of the battery.

Test of Battery Voltage: connecting the positive and negative electrodes of the battery to be nailed to the measuring end of the internal resistance meter, after the nailing is finished, carrying out the battery voltage tracking test for five minutes, and then recording the battery voltage at five minutes.

2) Test Method of Short-Circuit Internal Resistance of Nail Piercing:

The electrode assembly is discharged to 3.2V, and a steel nail with a diameter of 3 mm is used to needle the electrode assembly at the speed of 80 mm/s to monitor the Hall voltage (V) and Hall current (I) during nail piercing, to output real-time short-circuit resistance R=U/I.

3) Cycle Performance Test

At 45° C., the lithium ion secondary battery is charged to 4.2V at a constant current rate of 1 C, then charged at constant voltage until the current is less than or equal to 0.05 C, and then discharged to 2.8V at the constant current rate of 1 C, which is a charge-discharge cycle, and the discharge capacity this time is the discharge capacity of the first cycle. The lithium ion secondary battery was charged and discharged for 1000 times according to the above method, and the discharge capacity of the 1000th cycle was recorded.

The capacity retention rate (%) of the lithium ion secondary battery after 1000 cycles of 1 C/1 C at 45° C.=the discharge capacity of the 1000th cycle/the discharge capacity of the first cycle×100%

4) Test Method of T Value

When the tensile strain of the positive current collector is 2.5%, the growth rate of the square resistance of the conductive layer is T, and the T value can be tested as follows:

If the tensile strain of the positive current collector is set to $\varepsilon$ ($\varepsilon$=2.5%), then $\varepsilon=\Delta L/L \times 100\%$, where $\Delta L$ is the elongation caused by the stretching of the positive current collector, and L is the original length of the positive current collector, that is, the length before being stretched.

When the tensile strain of the positive current collector is c, the growth rate of the square resistance of the conductive layer is set as T, and the T value can be measured by the method known in the art. As an example, the positive current collector is cut into a sample of 20 mm×200 mm, and the square resistance in the central area of the sample is measured by the four-probe method, which is recorded as R1, and then the central area of the sample is stretched by a high-speed rail tensile machine, the initial position is set, and making the sample length between clamps is 50 mm, stretching at a speed of 50 mm/min, the stretching distance is the product of the original length L (50 mm) of the sample and c, that is, the stretching distance is $\Delta L$. Taking down the stretched sample, testing the square resistance of the conductive layer between the clamps, and recording it as R2, according to the formula $T=(R2-R1)/R1 \times 100\%$, calculating the growth rate T of the square resistance of the conductive layer when the tensile strain of the positive current collector is E.

Among them, the four-probe method is used to test the square resistance of the conductive layer as follows: using RTS-9 double electric four-probe tester, the test environment is room temperature 23±2° C., 0.1 MPa and relative humidity≤65%. During the test, the surface of the sample to be tested is cleaned and placed horizontally on the test table, then the four probes are put down to make good contact with the surface of the conductive layer, then the current range of the sample is calibrated by adjusting the automatic test mode, the square resistance is measured under the appropriate current range, and 8 to 10 data points of the same sample are collected for data measurement accuracy and error analysis. Finally, the average value is recorded as the square resistance of the conductive layer.

5) Test Method of DCR Growth Rate:

At 25° C., the secondary battery is adjusted to 50% SOC with 1 C current, and recording the voltage U1. Then discharging at a current of 4 C for 30 seconds and recording the voltage U2. DCR=(U1−U2)/4 C. Then, the battery is subjected to a 1 C/1 C charge-discharge cycle for 500 cycles, recording the DCR of the 500th DC Resistance. The DCR of the 500th cycle is divided by the DCR of the first cycle and subtracted by 1, and the DCR growth rate of the 500th cycle was obtained.

8. Test Results and Discussion:

8.1 the Role of Positive Current Collector in Improving the Weight and Energy Density of Electrochemical Devices.

TABLE 1

| Number | Support Layer Material | $D_2$ μm | Conductive Layer Material | $D_1$ μm | Thickness of Positive Current Collector μm | Weight Percentage of Positive Current Collector % |
|---|---|---|---|---|---|---|
| Positive Current Collector 91 | PET | 10 | Al | 0.5 | 11.0 | 50.0 |
| Positive Current Collector 92 | PI | 6 | Al | 0.3 | 6.6 | 30.0 |
| Positive Current Collector 93 | PI | 5 | Al | 1.5 | 8.0 | 45.8 |
| Positive Current Collector 94 | PET | 4 | Al | 0.9 | 5.8 | 31.7 |
| Positive Current Collector 95 | PI | 3 | Al | 0.2 | 3.4 | 16.7 |
| Positive Current Collector 96 | PI | 1 | Al | 0.4 | 1.8 | 10.8 |
| Conventional Positive Current Collector | / | / | Al | / | 12.0 | 100 |

The weight percentage of the positive current collector refers to the percentage of the weight of the positive current collector per unit area divided by the weight of the conventional positive current collector per unit area.

Compared with the conventional aluminum foil positive current collector, the weight of the positive current collector adopted by the present application is reduced in varying degrees, thus the weight energy density of the battery can be increased.

8.2 Influence of Thickness and Density of Conductive Layer

For simplicity, the electrode piece without the primer layer is used for research, but the conclusion is also applicable to the electrode piece with the primer layer.

TABLE 2[#]

| Number | Conductive Layer | | | | Support Layer | | | | |
|---|---|---|---|---|---|---|---|---|---|
| | Material | $D_1$ μm | Density g/cm$^3$ | Volume Resistivity Ω·m | Material | $D_2$ μm | Volume Resistivity Ω·m | EGPa | T % |
| Positive Current Collector 1 | Al | 2.0 | 2.6 | $3.7 \times 10^{-8}$ | PET | 10 | $2.1 \times 10^{14}$ | 4.2 | 3 |
| Positive Current Collector 2 | Al | 1.5 | 2.6 | $3.7 \times 10^{-8}$ | PET | 10 | $2.1 \times 10^{14}$ | 4.2 | 5 |
| Positive Current Collector 3 | Al | 1.2 | 2.7 | $2.7 \times 10^{-8}$ | PET | 10 | $2.1 \times 10^{14}$ | 4.2 | 0 |
| Positive current collector 4 | Al | 1.0 | 2.6 | $3.7 \times 10^{-8}$ | PET | 10 | $2.1 \times 10^{14}$ | 4.2 | 7 |
| Positive Current Collector 5 | Al | 0.9 | 2.5 | $5.5 \times 10^{-8}$ | PET | 10 | $2.1 \times 10^{14}$ | 4.2 | 53 |
| Positive current collector 6 | Al | 0.9 | 2.6 | $3.7 \times 10^{-8}$ | PI | 10 | $2.1 \times 10^{14}$ | 1.9 | 37 |
| Positive Current Collector 7 | Al | 0.9 | 2.7 | $2.7 \times 10^{-8}$ | PP | 10 | $2.1 \times 10^{14}$ | 2.2 | 0 |
| Positive Current Collector 8 | Al | 0.8 | 2.7 | $2.7 \times 10^{-8}$ | PPS | 10 | $2.1 \times 10^{14}$ | 4.0 | 0 |
| Positive Current Collector 9 | Aluminum Alloy | 1.0 | 2.8 | $3.0 \times 10^{-8}$ | PET | 10 | $2.1 \times 10^{14}$ | 4.2 | 2 |
| Positive Current Collector 10 | Al | 0.6 | 2.6 | $3.7 \times 10^{-8}$ | PEN | 10 | $2.1 \times 10^{14}$ | 5.1 | 10 |
| Positive Current Collector 11 | Al | 0.5 | 2.6 | $3.7 \times 10^{-8}$ | PEN | 10 | $2.1 \times 10^{14}$ | 5.1 | 15 |
| Positive Current Collector 12 | Al | 0.3 | 2.6 | $3.7 \times 10^{-8}$ | PEN | 10 | $2.1 \times 10^{14}$ | 5.1 | 21 |
| Conventional Positive Current Collector | Al | 12 | / | $2.8 \times 10^{-8}$ | / | / | / | / | / |
| Comparative Positive Current Collector 1 | Al | 0.9 | 2.4 | $7.2 \times 10^{-8}$ | PET | 10 | $2.1 \times 10^{14}$ | 9.1 | 92 |
| Comparative Positive Current Collector 2 | Aluminum Alloy | 1.0 | 2.3 | $15.1 \times 10^{-8}$ | PET | 10 | $2.1 \times 10^{14}$ | 4.2 | 210 |

[#]The aluminum alloy is aluminum alloy 7049 (aluminum-zinc alloy, American Fincola Company)

The flow test is performed on the positive current collector in Table 2, the positive current collector is cut into 100 mm width, coated with wide of 80 mm positive active material layer in the middle of width direction and rolled to make positive electrode pieces. The rolled electrode piece is cut into long strips of 100 mm×30 mm along the width direction, and 10 pieces of each electrode piece are cut. During the test, the conductive areas without membrane on both sides of the electrode piece sample are respectively connected to the positive and negative terminals of the charging and discharging machine, and then set the charging and discharging machine to make current of 1.2 A pass through the electrode piece. If the electrode piece does not fuse for 10 seconds, it will pass the test, otherwise it will be deemed as failing. Five samples were tested in each group, and the flow test results are shown in Table 3 below.

TABLE 3

| Positive Electrode Piece Number | Number of Positive Current Collector | Passing Rate of Flow Test (%) |
|---|---|---|
| Positive Electrode Piece 1 | Positive Current Collector 1 | 100 |
| Positive Electrode Piece 2 | Positive Current Collector 2 | 100 |
| Positive Electrode Piece 3 | Positive Current Collector 3 | 100 |
| Positive Electrode Piece 4 | Positive Current Collector 4 | 100 |
| Positive Electrode Piece 5 | Positive Current Collector 5 | 60 |
| Positive Electrode Piece 6 | Positive Current Collector 6 | 70 |
| Positive Electrode Piece 7 | Positive Current Collector 7 | 100 |
| Positive Electrode Piece 8 | Positive Current Collector 8 | 100 |

TABLE 3-continued

| Positive Electrode Piece Number | Number of Positive Current Collector | Passing Rate of Flow Test (%) |
|---|---|---|
| Positive Electrode Piece 9 | Positive Current Collector 9 | 100 |
| Positive Electrode Piece 10 | Positive Current Collector 10 | 100 |
| Positive Electrode Piece 11 | Positive Current Collector 11 | 90 |
| Positive Electrode Piece 12 | Positive Current Collector 12 | 80 |
| Conventional Positive Electrode Piece | Conventional Positive Current Collector | 100 |
| Comparative Electrode Piece 1 | Comparative Positive Current Collector 1 | 0 |
| Comparative Electrode Piece 2 | Comparative Positive Current Collector 2 | 0 |

It can be seen from the data in Table 3 that the electrical performance of the positive current collector is poor when the density of the aluminum-based conductive layer of the positive current collector is not 2.5 g/cm³ to 2.8 g/cm³. When the density of the aluminum-based conductive layer is 2.5 g/cm³ to 2.8 g/cm³, the electrical performance of the positive current collector is better, and the passing rate in the flow test is significantly improved, reaching 100%.

8.3 Influence of Protective Layer

For simplicity, the electrode piece without the primer layer is used for research, but the conclusion is also applicable to the electrode piece with the primer layer.

TABLE 4

| | Lower Protective Layer | | Upper Protective Layer | |
|---|---|---|---|---|
| Number | Material | $D_b$ (nm) | Material | $D_a$ (nm) |
| Positive Current Collector 4 | / | / | / | / |
| Positive Current Collector 4-1 | / | / | Nickel | 1 |
| Positive Current Collector 4-2 | / | / | Nickel Oxide | 10 |
| Positive Current Collector 4-3 | / | / | Alumina | 50 |
| Positive Current Collector 4-4 | / | / | Nickel Oxide | 100 |
| Positive Current Collector 4-5 | Nickel | 5 | / | / |
| Positive Current Collector 4-6 | Alumina | 20 | / | / |
| Positive Current Collector 4-7 | Alumina | 80 | / | / |
| Positive Current Collector 4-8 | Nickel Oxide | 100 | / | / |
| Positive Current Collector 4-9 | Nickel | 5 | Nickel | 10 |
| Positive Current Collector 4-10 | Nickel Oxide | 8 | Nickel Oxide | 10 |
| Positive Current Collector 4-11 | Alumina | 20 | Nickel Oxide | 50 |
| Positive Current Collector 4-12 | Nickel Oxide | 30 | Alumina | 50 |
| Positive Current Collector 4-13 | Alumina | 50 | Alumina | 100 |

In Table 4, all of the positive current collectors 4-1 to 4-13 are based on the positive current collector 4 to set a protective layer.

TABLE 5

| Number of Battery | Number of Positive Current Collector | Capacity Retention Rate After 1000 Cycles of 1 C/1 C at 45° C. (%) |
|---|---|---|
| Conventional Battery 1 | Conventional Positive Current Collector | 86.5 |
| Battery 4 | Positive Current Collector 4 | 77.3 |
| Battery 4-1 | Positive Current Collector 4-1 | 78.1 |
| Battery 4-2 | Positive Current Collector 4-2 | 79.4 |
| Battery 4-3 | Positive Current Collector 4-3 | 79.9 |
| Battery 4-4 | Positive Current Collector 4-4 | 78.9 |
| Battery 4-5 | Positive Current Collector 4-5 | 78.2 |
| Battery 4-6 | Positive Current Collector 4-6 | 79.5 |
| Battery 4-7 | Positive Current Collector 4-7 | 80.6 |
| Battery 4-8 | Positive Current Collector 4-8 | 79.8 |
| Battery 4-9 | Positive Current Collector 4-9 | 81.8 |
| Battery 4-10 | Positive Current Collector 4-10 | 83.9 |
| Battery 4-11 | Positive Current Collector 4-11 | 87.1 |
| Battery 4-12 | Positive Current Collector 4-12 | 87.6 |
| 1 Battery 4-13 | Positive Current Collector 4-13 | 87.3 |

The battery using the positive current collector of the embodiment of the present application has a good cycle life, especially for the battery made of the positive current collector with a protective layer, the capacity retention rate of the battery is further improved after 1000 cycles of 1 C/1 C at 45° C., indicating that the reliability of the battery is better.

8.4 Effect of Composite Current Collector on Improving the Safety of Battery Nail Piercing For simplicity, the electrode piece without the primer layer is used for research, but the conclusion is also applicable to the electrode piece with the primer layer. The test results are as follows:

TABLE 6

| | | Nail Piercing Experiment | |
|---|---|---|---|
| Number of Battery | Number of Positive Current Collector | Temperature Raised of Battery (° C.) | Battery Voltage (V) |
| Battery 1 | Positive Current Collector 1 | 31 | 3.71 |
| Battery 2 | Positive Current Collector 2 | 25 | 3.90 |
| Battery 3 | Positive Current Collector 3 | 21 | 3.85 |
| Battery 4 | Positive Current Collector 4 | 3 | 4.02 |
| Battery 5 | Positive Current Collector 5 | 7 | 3.85 |
| Battery 6 | Positive Current Collector 6 | 5 | 3.98 |
| Battery 7 | Positive Current Collector 7 | 13 | 3.6 |
| Battery 8 | Positive Current Collector 8 | 2 | 4.11 |

TABLE 6-continued

| Number of Battery | Number of Positive Current Collector | Nail Piercing Experiment Temperature Raised of Battery (° C.) | Battery Voltage (V) |
|---|---|---|---|
| Battery 9 | Positive Current Collector 9 | 9 | 4.09 |
| Battery 10 | Positive Current Collector 10 | 3 | 4.15 |
| Battery 11 | Positive Current Collector 11 | 2 | 4.21 |
| Conventional Battery 1 | Conventional Positive Current Collector | >500 | 0 |

The composite current collector can greatly improve the nail piercing safety performance of the battery. As can be seen from the data in the table, the temperature of the battery using conventional positive current collector rises sharply by 500° C. and the voltage drops to zero at the moment of nail piercing, which shows that at the moment of nail piercing, the battery has an internal short circuit, producing a lot of heat, and the battery is instantly thermal out of control and destroyed, resulting in failure. For the battery with composite current collector, in the nail piercing test, the temperature rise of the battery can be controlled below 35° C., further below 25° C., and further below 10° C., and the battery voltage is basically stable, and the battery can work normally.

It can be seen that in the case of internal short circuit of the battery, the composite current collector can greatly reduce the heat production of the short circuit, thus improving the safety performance of the battery; in addition, the influence of short circuit damage on the battery can be limited to the range of "point", and only a "point open circuit" is formed, without affecting the normal operation of the battery for a period of time.

However, when the current collector with higher density and thickness of conductive layer is used to improve the conductivity and flow capacity of current collector and positive electrode piece, the nail piercing safety performance of battery cannot reach the ideal state. Therefore, the primer layer is introduced into the positive electrode piece to further research its influence on the safety performance of nail piercing.

TABLE 7

| Number of Positive Electrode Piece | Positive Current Collector | Primer Layer | Electrode active material layer |
|---|---|---|---|
| Positive Electrode Piece 3 | Positive Current Collector 3 | / | NCM333, D50 9.8 μm, Thickness of Active material layer 55 μm |
| Positive Electrode Piece 37 | Positive Current Collector 37* | / | NCM333, D50 9.8 μm, Thickness of Active material layer 55 μm |
| Positive Electrode Piece 3-6-1 | Positive Current Collector 3 | Conductive Carbon Black 1%, Water Soluble Polyacrylic Acid 99%, Thickness 1.5 μm | NCM333, D50 9.8 μm, Thickness of Active material layer 55 μm |
| Positive Electrode Piece 3-6-2 | Positive Current Collector 3 | Conductive Carbon Black 5%, Water Soluble Polyacrylic Acid 95%, Thickness 1.5 μm | NCM333, D50 9.8 μm, Thickness of Active material layer 55 μm |
| Positive Electrode Piece 3-6-3 | Positive Current Collector 3 | Conductive Carbon Black 10%, Water Soluble Polyacrylic Acid 90%, Thickness 1.5 μm | NCM333, D50 9.8 μm, Thickness of Active material layer 55 μm |
| Positive Electrode Piece 3-6-4 | Positive Current Collector 3 | Conductive Carbon Black 20%, Water Soluble Polyacrylic Acid 80%, Thickness 1.5 μm | NCM333, D50 9.8 μm, Thickness of Active material layer 55 μm |
| Positive Electrode Piece 3-6-5 | Positive Current Collector 3 | Conductive Carbon Black 50%, Water Soluble PVDF 50%, Thickness 1.5 μm | NCM333, D50 9.8 μm, Thickness of Active material layer 55 μm |
| Positive Electrode Piece 3-6-6 | Positive Current Collector 3 | Conductive Carbon Black 65%, Water Soluble PVDF 35%, Thickness 1.5 μm | NCM333, D50 9.8 μm, Thickness of Active material layer 55 μm |
| Positive Electrode Piece 3-6-7 | Positive Current Collector 3 | Conductive Carbon Black 70%, Water Soluble Polyacrylic Acid 30%, Thickness 1.5 μm | NCM333, D50 9.8 μm, Thickness of Active material layer 55 μm |
| Comparative Positive Electrode Piece 3-6-1 | Positive Current Collector 3 | Conductive Carbon Black 80%, Water Soluble PVDF 20%, Thickness 1.5 μm | NCM333, D50 9.8 μm, Thickness of Active material layer 55 μm |
| Comparative Positive Electrode Piece 3-6-2 | Positive Current Collector 3 | Conductive Carbon Black 99%, Water Soluble PVDF 1%, Thickness 1.5 μm | NCM333, D50 9.8 μm, Thickness of Active material layer 55 μm |

TABLE 7-continued

| Number of Positive Electrode Piece | Positive Current Collector | Primer Layer | Electrode active material layer |
|---|---|---|---|
| Positive Electrode Piece 3-6-8 | Positive Current Collector 3 | Conductive Carbon Black 50%, Oil Soluble PVDF 50%, Thickness 1.5 μm | NCM333, D50 9.8 μm, Thickness of Active material layer 55 μm |
| Positive Electrode Piece 3-6-9 | Positive Current Collector 3 | Conductive Carbon Black 65%, Oil Soluble PVDF 35%, Thickness 1.5 μm | NCM333, D50 9.8 μm, Thickness of Active material layer 55 μm |
| Positive Electrode Piece 3-6-10 | Positive Current Collector 3 | Conductive Carbon Black 25%, Flake Conductive Graphite (D50 0.05 μm) 25%, Water Soluble PVDF 50%, Thickness 1.5 μm | NCM333, D50 9.8 μm, Thickness of Active material layer 55 μm |
| Positive Electrode Piece 3-6-11 | Positive Current Collector 3 | Conductive Carbon Black 25%, Nanotube 25%, Water Soluble PVDF 50%, Thickness 1.5 μm | NCM333, D50 9.8 μm, Thickness of Active material layer 55 μm |
| Positive Electrode Piece 3-6-12 | Positive Current Collector 3 | Conductive Carbon Black 50%, Water Soluble PVDF 50%, Thickness 500 nm | NCM333, D50 9.8 μm, Thickness of Active material layer 55 μm |
| Positive Electrode Piece 3-6-13 | Positive Current Collector 3 | Conductive Carbon Black 50%, Water Soluble PVDF 50%, Thickness 2 μm | NCM333, D50 9.8 μm, Thickness of Active material layer 55 μm |
| Positive Electrode Piece 3-6-14 | Positive Current Collector 3 | Conductive Carbon Black 50%, Water Soluble PVDF 50%, Thickness 5 μm | NCM333, D50 9.8 μm, Thickness of Active material layer 55 μm |

*Same as the positive current collector 3 except that the density of the conductive layer is 2.0 g/cm³.

The test results are as follows:

TABLE 8

| Number of Battery | Number of Positive Electrode Piece | Short-circuit Internal Resistance of Nail Piercing (Ω) | Growth Rate of DCR |
|---|---|---|---|
| Battery 3 | Positive Electrode Piece 3 | 1.5 | 34% |
| Battery 37 | Positive Electrode Piece 37 | 1.6 | 40% |
| Battery 3-6-1 | Positive Electrode Piece 3-6-1 | 2.1 | 33% |
| Battery 3-6-2 | Positive Electrode Piece 3-6-2 | 1.89 | 31.6% |
| Battery 3-6-3 | Positive Electrode Piece 3-6-3 | 1.75 | 30.9% |
| Battery 3-6-4 | Positive Electrode Piece 3-6-4 | 1.6 | 29% |
| Battery 3-6-5 | Positive Electrode Piece 3-6-5 | 1.3 | 20% |
| Battery 3-6-6 | Positive Electrode Piece 3-6-6 | 1.26 | 15% |
| Battery 3-6-7 | Positive Electrode Piece 3-6-7 | 1.2 | 14.7% |
| Battery 3-6-1 | Comparative Positive Electrode Piece 3-6-1 | 1.12 | 14.5% |
| Battery 3-6-2 | Comparative Positive Electrode Piece 3-6-2 | 1.03 | 14% |
| Battery 3-6-8 | Positive Electrode Piece 3-6-8 | 1.4 | 22% |
| Battery 3-6-9 | Positive Electrode Piece 3-6-9 | 1.3 | 18.5% |
| Battery 3-6-10 | Positive Electrode Piece 3-6-10 | 1.39 | 19% |
| Battery 3-6-11 | Positive Electrode Piece 3-6-11 | 1.3 | 16% |
| Battery 3-6-12 | Positive Electrode Piece 3-6-12 | 1.35 | 19.5% |
| Battery 3-6-13 | Positive Electrode Piece 3-6-13 | 1.28 | 18% |
| Battery 3-6-14 | Positive Electrode Piece 3-6-14 | 1.25 | 17.2% |

8.5 Effect of Coating Method of Electrode Active Material Layer on Performance of Electrode Piece.

The following describes the influence of different coating methods of the active material layer on the flatness of the electrode piece. Specifically, the flatness of the following three different types of positive electrode pieces were compared. In order to simplify the influencing factors, all of the comparative electrode pieces are not provided with the primer layer, but the conclusion is also applicable to electrode pieces provided with the primer layer.

1) Positive Electrode Piece Coated by Zones:

The adopted composite current collector is: Al metal layers with a thickness of 1 μm are vapor deposited on two surfaces of PET with a thickness of 10 μm.

92 wt % of positive active material NCM333, 5 wt % of conductive agent Super-P (referred to as "SP") and 3 wt % of PVDF were uniformly stirred with NMP as solvent to prepare positive active material layer slurry.

Zone coating is carried out on the two surfaces of the composite current collector by extrusion coating, that is, the area with high coating weight in the middle and the area with low coating weight on both sides (which can be achieved by extruding gasket or baffle), which is dried at 85° C. Among them, the width of the high coating weight area is 4 cm, and the widths of the low coating weight areas are 2.1 cm.

Then cold pressing and cutting are carried out, and then dried in vacuum at 85° C. for 4 hours. The tab is welded and the positive electrode piece is obtained.

The compaction density of the high coating weight area is 3.45 g/cm³, and that of the low coating weight area is 3.3 g/cm³.

Test method of compaction density: firstly, 30 small current collector wafers with area S are cut, and measuring their weight and thickness, and the average weight M1 and average height H1 are obtained. Then 30 small electrode piece wafers with S area are cut out, and measuring their average weight $m_2$ and average height $H_2$ are obtained. Then:

Compaction density=$(m_2-m_1)/(H_2-H_1)*S$)

2) Uniformly Coated Comparative Positive Electrode Piece:

The current collector also adopts the above-mentioned 10 μm-thick PET Al-plated composite current collector, the preparation method similar to the above preparation method of the positive electrode piece is adopted, but the positive active material layer slurry is directly and uniformly coated on the two surfaces of the composite current collector, that is, the zoning processing is not carried out, and then the uniformly coated comparative positive electrode piece is obtained after post-processing. The compaction density of positive active material layer is 3.4 g/cm³.

3) Conventional Positive Electrode Piece

The current collector is a metal Al foil with a thickness of 12 μm, the preparation method similar to the above preparation method of the comparative positive electrode piece is adopted, the positive active material layer slurry is directly and uniformly coated on the two surfaces of the Al foil current collector, and then the conventional positive electrode piece is obtained by post-processing.

Measuring the flatness of the above three different electrode pieces. The test of the flatness of the electrode piece is characterized by measuring the arc height of the electrode piece relative to the reference plane. The specific methods of measuring arc height are as follows:

Taking an electrode piece sample with a length of 2 m, placing the sample on a reference plane and expanding it along the width direction of the plane, the width of the plane is slightly smaller than the length of the electrode piece sample, and then placing a weight of equal weight (1 Kg) on each side of the sample to make the sample cling to the plane. Then using a soft ruler to measure the height of the middle position of the sample above the plane, which is the arc height. In actual production, it is generally considered that the electrode piece with arc height less than or equal to 2 mm is flat, and the positive and negative electrode pieces can be accurately aligned when assembled into a battery.

The following table shows the specific measurement results:

TABLE 9

| Electrode Piece | Arc Height |
| --- | --- |
| Positive Electrode Piece Coated by Zones | <2 mm |
| Uniformly Coated Comparative Positive Electrode Piece | >5 mm |
| Conventional Positive Electrode Piece | <2 mm |

According to the measurement results of the above table, the conventional positive electrode pieces using metal current collector can meet the flatness requirements of the electrode pieces (arc height is less than or equal to 2 mm), which can realize accurate alignment during battery assembly. However, if the composite current collector is uniformly coated according to the conventional process, the arc height of the electrode piece is larger (greater than 5 mm), and the flatness of the electrode piece is not good, which makes it difficult to achieve accurate alignment during battery assembly. After using the zonal coating process in the present application, the arc height is obviously reduced, which is similar to that of the conventional electrode piece, and the accurate alignment of the battery assembly can be realized. This shows that the special design of zonal coating of active material layer can eliminate or reduce the edge warping and radian of the electrode piece containing composite current collector after rolling, and improve the flatness of the electrode piece, thus realizing the accurate alignment of the battery assembly, at the same time, enabling the battery to have excellent electrochemical performance and safety performance brought by the composite current collector.

The person skilled in the art could understand that the application instance of the electrode piece in the present application is shown by taking the lithium battery as an example, but the electrode piece in the present application can also be applied to other types of electrochemical devices, and the good technical effect of the present application can still be obtained.

According to the disclosure and teaching of the above specification, the person skilled in the art of the present application can also make appropriate changes and modifications to the above embodiments. Therefore, the present application is not limited to the specific embodiments disclosed and described above, and some amendments and changes to the present application should also fall within the scope of protection of the claims in the present application. In addition, although some specific terms are used in this specification, these terms are only for convenience of explanation, and do not constitute any restrictions on the present application.

The invention claimed is:

1. A positive electrode piece, comprising:
   a current collector, wherein the current collector comprises a support layer and a conductive layer disposed on at least one surface of the support layer, wherein
      a single side thickness D2 of the conductive layer satisfies 30 nm≤D2≤3 μm,
      a material of the conductive layer is aluminum or aluminum alloy,
      a volume resistivity of the conductive layer is $2.7\times10^{-8}\Omega\cdot m$ to $5.\times10^{-8}\Omega\cdot m$, and
      a density of the conductive layer is 2.5 g/cm³ to 2.8g/cm³, and
   a material of the support layer is selected from at least one of a conductive polymer material and a conductive polymer composite material, from a direction of a width of a coated surface of the positive electrode piece;
      the support layer has a Young's modulus (E) at room temperature of 4 GPa≤E≤20 GPa;
   an electrode active material layer disposed on at least one surface of the current collector, wherein
   the electrode active material layer comprises three regions extending in a winding direction of the positive electrode piece, the three regions comprising a middle region and two side regions in the direction of the width, wherein the two side regions have a first compaction density and the middle region has a second compaction density, wherein the first compaction density is at least 4% lower than the second compaction density, wherein the direction of the width is perpendicular to the winding direction of the positive electrode piece; and a primer layer comprising a conductive material and a binder, wherein the primer layer is arranged between the current collector and the electrode active material layer, wherein the conductive material is a conductive carbon material, and the conductive carbon material is selected from at least one of zero-dimensional conductive carbon material, one-dimensional conductive carbon material, two-dimensional conductive carbon material and three-dimensional conductive carbon material, wherein when the conductive carbon material comprises the one-dimensional conductive carbon material and the two-dimensional conductive carbon material, the one-dimensional conductive carbon material and the two-dimensional conductive carbon material account for 1 wt % to 50 wt % of the conductive material.

2. The positive electrode piece according to claim 1, wherein the single side thickness D2 of the conductive layer satisfies 300 nm≤D2≤2 μm.

3. The positive electrode piece according to claim 1, wherein a surface of the conductive layer is also provided with a protective layer, the protective layer is only arranged on one surface or both surfaces of the conductive layer of the current collector; and a thickness of the protective layer D3 satisfies D3≤1/10D2 and 1 nm≤D3≤200 nm.

4. The positive electrode piece according to claim 1, wherein the protective layer is a metal protective layer or a metal oxide protective layer; and the conductive layer comprises an upper protective layer and a lower protective layer, and a thickness of the upper protective layer is $D_a$, 1 nm≤$D_a$≤200 nm and $D_a$≤0.1D1; and a thickness of the lower protective layer is $D_b$, 1 nm≤$D_b$≤200 nm and $D_b$≤0.1D1; $D_a$>$D_b$; and both the upper protective layer and the lower protective layer are metal oxide protective layers.

5. The positive electrode piece according to claim 1, wherein, based on the total weight of the primer layer, a weight percentage content of the binder is 30% to 99%; and/or, based on the total weight of the primer layer, a weight percentage content of the conductive material is 1% to 70%.

6. The positive electrode piece according to claim 1, wherein the binder is selected from at least one of styrene-butadiene rubber, oil soluble polyvinylidene fluoride (PVDF), PVDF-HFP copolymers, PVDF-TFE copolymers, sodium carboxymethyl cellulose, polystyrene, polyacrylic acid, polytetrafluoroethylene, polyacrylonitrile, polyimide, water soluble PVDF, polyurethane, polyvinyl alcohol, polyacrylate, polyacrylic acid-polyacrylonitrile copolymer, and polyacrylate-polyacrylonitrile copolymer.

7. The positive electrode piece according to claim 1, wherein a thickness of the primer layer H is 0.1 μm to 5 μm.

8. The positive electrode piece according to claim 1, wherein the electrode active material layer comprises an electrode active material, a binder and a conductive agent.

9. An electrochemical device, comprising a positive electrode piece, a negative electrode piece, an isolation membrane and electrolyte, wherein the positive electrode piece is the positive electrode piece according to claim 1.

10. An apparatus, comprising the electrochemical device of claim 9.

11. The positive electrode piece according to claim 1, wherein the first compaction density is 5% to 30% lower than the second compaction density.

12. The positive electrode piece according to claim 1, wherein the middle region has an area 20% to 80% of a total area of the middle region and the two side regions.

13. The positive electrode piece according to claim 1, wherein the support layer has a thermal shrinkage at 90° C. not more than 1.5%.

14. The positive electrode piece according to claim 1, wherein the support layer has an elongation at break less than less than 400%.

* * * * *